US011352034B2

(12) United States Patent
Ross et al.

(10) Patent No.: US 11,352,034 B2
(45) Date of Patent: Jun. 7, 2022

(54) TRUSTED VEHICLE ACCIDENT AVOIDANCE CONTROL

(71) Applicant: Raytheon Company, Waltham, MA (US)

(72) Inventors: Richard C. Ross, Westlake Village, CA (US); Michael J. Holihan, Tucson, AZ (US); John J. Ermer, Sherman Oaks, CA (US)

(73) Assignee: Raytheon Company, Waltham, MA (US)

( * ) Notice: Subject to any disclaimer, the term of this patent is extended or adjusted under 35 U.S.C. 154(b) by 198 days.

(21) Appl. No.: 16/601,448

(22) Filed: Oct. 14, 2019

(65) Prior Publication Data

US 2021/0107537 A1    Apr. 15, 2021

(51) Int. Cl.
*B60W 30/09* (2012.01)
*B61L 3/00* (2006.01)
(Continued)

(52) U.S. Cl.
CPC .......... *B61L 3/008* (2013.01); *B60W 30/09* (2013.01); *B60W 40/04* (2013.01); *B60W 50/16* (2013.01);
(Continued)

(58) Field of Classification Search
CPC .... B61L 3/008; B61L 25/021; B61L 15/0072; B61L 25/026; B61L 25/025;
(Continued)

(56) References Cited

U.S. PATENT DOCUMENTS 5,893,043 A    4/1999 Moehlenbrink et al.
6,826,478 B2   11/2004 Riewe et al.
(Continued)

FOREIGN PATENT DOCUMENTS

DE   102012215533 A1   3/2014
EP       2292492 A2    3/2011
EP       3527948 A1    8/2019

OTHER PUBLICATIONS

International Search Report for International Application No. PCT/US2020/046512 dated Nov. 26, 2020, 14 pages.
(Continued)

*Primary Examiner* — Jason Holloway

(57) ABSTRACT

A trusted accident avoidance control system supported on a vehicle operable to travel a path, and comprising at least first and second location determination components operable to estimate a current position of the vehicle. An error correction component can receive the estimated current position information from the first and second location determination components and determine an updated estimated current position of the vehicle based on these, wherein the error correction component can be operable with a path database to identify a predetermined threshold velocity for the updated estimated current position of the vehicle. A velocity management component can determine, based on the updated estimated current position, whether a current velocity of the vehicle exceeds the predetermined threshold velocity, and if so, initiate an accident avoidance measure. The trusted accident avoidance control system is self-contained to the vehicle, not relying on outside sources to generate any estimated current positions.

31 Claims, 10 Drawing Sheets

(51) Int. Cl.
  *B60W 40/04* (2006.01)
  *B60W 50/16* (2020.01)
  *B60W 50/14* (2020.01)
(52) U.S. Cl.
  CPC . *B60W 2050/143* (2013.01); *B60W 2050/146* (2013.01); *B60W 2420/42* (2013.01); *B60W 2520/10* (2013.01); *B60W 2520/28* (2013.01); *B60W 2720/10* (2013.01)
(58) Field of Classification Search
  CPC ...... B60W 30/09; B60W 40/04; B60W 50/16; B60W 2050/143; B60W 2050/146; B60W 2420/42; B60W 2520/10; B60W 2520/28; B60W 2720/10
  See application file for complete search history.

(56) References Cited

U.S. PATENT DOCUMENTS

| | | | |
|---|---|---|---|
| 7,092,801 B2 | 8/2006 | Kane et al. | |
| 9,139,210 B2 | 9/2015 | Ning et al. | |
| 9,162,691 B2 | 10/2015 | Polivka et al. | |
| 9,434,397 B2 | 9/2016 | Chung et al. | |
| 2003/0216865 A1 | 11/2003 | Riewe et al. | |
| 2009/0033540 A1 | 2/2009 | Breed et al. | |
| 2010/0312461 A1 | 12/2010 | Haynie et al. | |
| 2011/0046827 A1* | 2/2011 | Yoon | B61L 27/04 701/20 |
| 2012/0274772 A1 | 11/2012 | Fosburgh et al. | |
| 2013/0284859 A1* | 10/2013 | Polivka | B61L 1/188 246/34 R |
| 2016/0046308 A1* | 2/2016 | Chung | B61L 25/021 701/20 |
| 2016/0075354 A1 | 3/2016 | Jung et al. | |
| 2016/0121912 A1 | 5/2016 | Puttagunta et al. | |
| 2018/0057030 A1 | 3/2018 | Puttagunta et al. | |
| 2018/0362057 A1 | 12/2018 | Golden et al. | |
| 2020/0318973 A1 | 10/2020 | Bush et al. | |

OTHER PUBLICATIONS

International Search Report for International Application No. PCT/US2020/046518 dated Nov. 24, 2020, 14 pages.

* cited by examiner

| TRACK SECTION | BEGIN POINT | END POINT | THRESHOLD VELOCITY |
|---|---|---|---|
| 1 | 302 | 304 | 45 MPH |
| 2 | 304 | 306 | 35 MPH |
| 3 | 306 | 308 | 25 MPH |
| 4 | 308 | 310 | 55 MPH |
| 5 | 310 | 312 | 65 MPH |

FIG. 3B

| LANDMARK | VISUAL IDENTIFICATION DATA | LOCATION |
|---|---|---|
| 1 | DATA 1 | 402 |
| 2 | DATA 2 | 404 |
| 3 | DATA 3 | 406 |
| 4 | DATA 4 | 408 |
| 5 | DATA 5 | 410 |

FIG. 4B

TRUSTED VEHICLE ACCIDENT AVOIDANCE CONTROL

BACKGROUND

Modern vehicles increasingly incorporate more sophisticated and modern computer technology to both increase efficiency and safety, as well as to reduce operation costs. This is especially true for vehicles that are configured to run on a predetermined path, such as trains operating on fixed railroad tracks, or self-driving vehicles operating on roads. For these vehicles, advances in computer technology has allowed many tasks to be automated, thus reducing the need for manual control by an operator.

However, as the performance of certain tasks is shifted from vehicle operators to computer controlled systems employing advanced computer technology some problems remain. For example, vehicles that are configured to run on predetermined paths risk significant damage and pose significant threats to life if they are involved in an accident where the vehicle is inadvertently removed or caused to be removed from the predetermined path (e.g., a train derailing from its track). Thus, maintaining a vehicle on the predetermined path and attempting to avoid accidents where the vehicle leaves or deviates from the predetermined path, such as attempting to reduce the chance of a train derailing from its fixed tracks, is an important priority for positive control systems incorporated into vehicles operating in accordance with a predetermined path. However, current systems in place to accomplish this are limited in their ability and function as they typically involve inadequate technology, technology that is cost-prohibitive, or technology that is subject to being compromised (e.g., radio navigation systems, such as satellite-based global positioning systems and others, being spoofed, delegitimized or simply jammed), thus resulting in the still frequent occurrence of accidents, many of which come at a high cost, not only in terms of expense, but also in terms of human lives lost.

In one example, Positive Train Control (PTC) is a type of accident avoidance control system that seeks to automate certain functions to control the train for the purpose of avoiding dangerous conditions that often lead to accidents or derailment of trains. Current PTC systems rely on radio navigation, for example satellite-based Global Positioning Systems (GPS) navigation. Two primary problems are associated with current PTC systems. First, they are extremely expensive to implement in terms of required infrastructure, thus prohibiting their use on most railways. Second, they are subject to compromise or malicious interference of the computer systems, control signals and/or commands. For example, current PTC systems are vulnerable to the spoofing or jamming of GPS signals received by a GPS receiver onboard the train, which GPS signals are used for navigational and/or control purposes. As a result, protecting against malicious interference should be a high priority for any vehicle control system.

BRIEF DESCRIPTION OF THE DRAWINGS

Features and advantages of example embodiments will be apparent from the detailed description which follows, taken in conjunction with the accompanying drawings, which together illustrate, by way of example, features; and, wherein:

FIG. 3B illustrates an example computer threshold velocity database comprising the known pre-surveyed information from the fixed track of FIG. 3A, wherein the computer threshold velocity database can be used by the trusted train derailment avoidance control system of FIG. 2, in accordance with an example of the present disclosure.

FIG. 4B illustrates an example computer landmark database comprising the known pre-surveyed information from the fixed track of FIG. 4A, wherein the computer landmark database can be used by the trusted train derailment avoidance control system of FIG. 2, in accordance with an example of the present disclosure.

Figure 1:
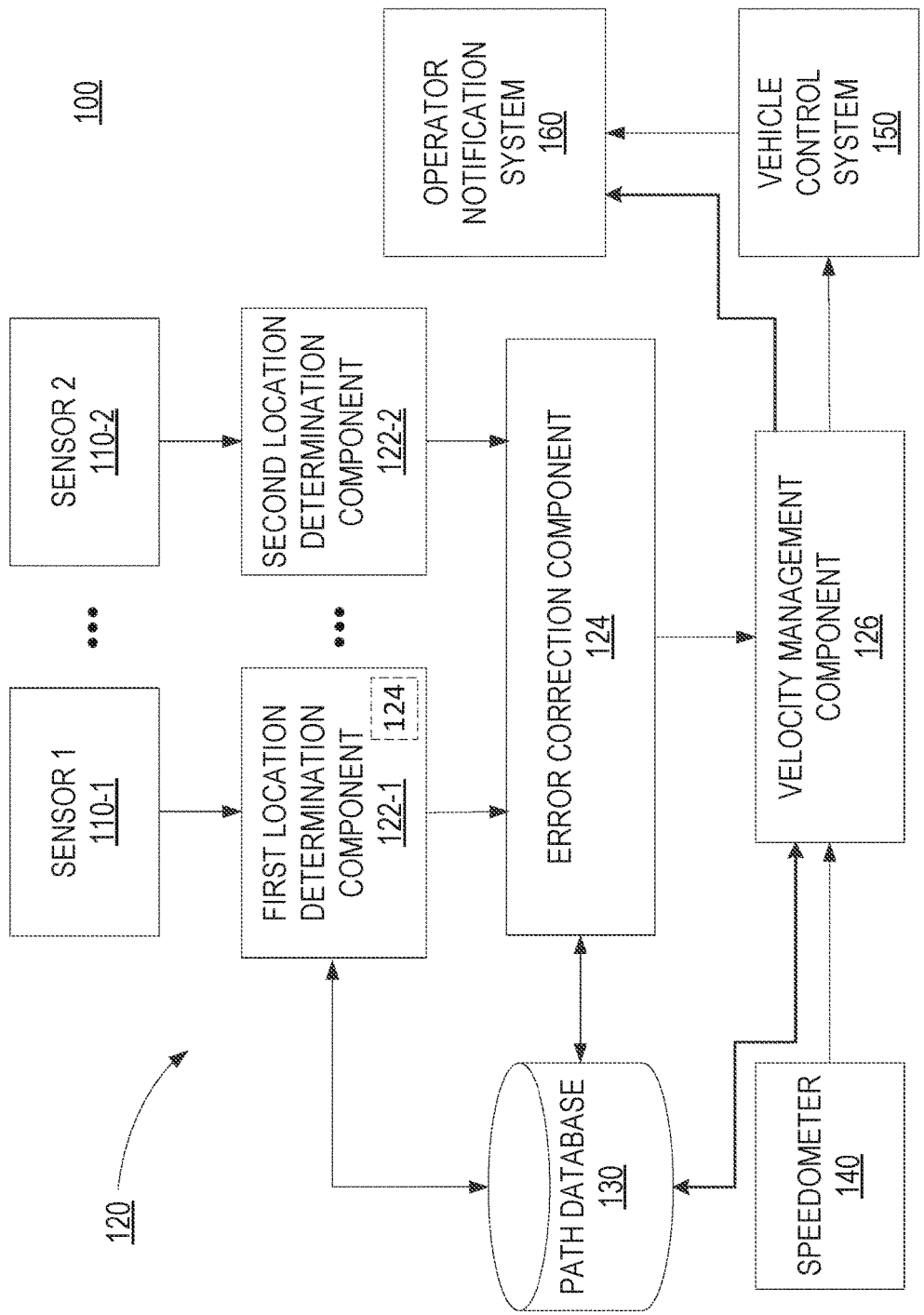
FIG. 1 illustrates a block diagram of a vehicle that includes a trusted accident avoidance control system for reducing the risk of the vehicle inadvertently departing from or otherwise leaving a predetermined path (e.g., a train derailing from its fixed track), in accordance with an example of the present disclosure.

Reference will now be made to the examples illustrated, and specific language will be used herein to describe the same. It will nevertheless be understood that no limitation on scope is thereby intended.

DETAILED DESCRIPTION

Before technology examples are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for describing particular examples or embodiments only and is not intended to be limiting. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, vehicles, track layouts, database configurations, etc., to convey a thorough understanding of various technology examples. One skilled in the relevant art will recognize, however, that such detailed examples do not limit the overall inventive concepts articulated herein but are merely representative thereof.

As used in this written description, the singular forms "a," "an" and "the" include express support for plural referents unless the context clearly dictates otherwise. Thus, for example, reference to "an" engine includes a plurality of such engines.

Reference throughout this specification to "an example" means that a particular feature, structure, or characteristic described in connection with the example is included in at least one invention embodiment. Thus, appearances of the phrases "in an example" or "in an embodiment" in various places throughout this specification are not necessarily all referring to the same example or embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various invention embodiments and examples can be referred to herein along with alternatives for the various components thereof. It is understood that such embodiments, examples, and alternatives are not to be construed as de facto equivalents of one another, but are to be considered as separate and autonomous representations under the present disclosure.

Furthermore, the described features, structures, or characteristics can be combined in any suitable manner in one or more examples. In the following description, numerous specific details are provided, such as examples of layouts, distances, network examples, etc., to provide a thorough understanding of invention aspects. One skilled in the relevant art will recognize, however, that the technology can be practiced without one or more of the specific details, or with other methods, components, layouts, etc. In other instances, well-known structures, materials, or operations cannot be shown or described in detail to avoid obscuring aspects of the disclosure.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps can be performed, and certain of the stated steps can possibly be omitted and/or certain other steps not described herein can possibly be added to the method.

As used herein, comparative terms such as "increased," "decreased," "better," "worse," "higher," "lower," "enhanced," "minimized," "maximized," "increased," "reduced," and the like refer to a property of a device, component, function, or activity that is measurably different from other devices, components, or activities in a surrounding or adjacent area, in a single device or in multiple comparable devices, in a group or class, in multiple groups or classes, related or similar processes or functions, or as compared to the known state of the art. For example, a data region that has an "increased" risk of corruption can refer to a region of a memory device, which is more likely to have write errors to it than other regions in the same memory device. A number of factors can cause such increased risk, including location, fabrication process, number of program pulses applied to the region, etc.

The term "coupled," as used herein, is defined as directly or indirectly connected in an electrical or nonelectrical manner. "Directly coupled" items or objects are in physical contact and attached to one another. Objects or elements described herein as being "adjacent to" each other can be in physical contact with each other, in close proximity to each other, or in the same general region or area as each other, as appropriate for the context in which the phrase is used.

Various techniques, or certain aspects or portions thereof, can take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object-oriented programming language to communicate with a computer system. However, the program(s) can be implemented in assembly or machine language, if desired. In any case, the language can be a compiled or interpreted language, and combined with hardware implementations.

As used herein, the term "processor" can include general purpose processors, specialized processors such as central processing units (CPUs), graphics processing units (GPUs), digital signal processors (DSPs), microcontrollers (MCUs), embedded controller (ECs), field programmable gate arrays (FPGAs), or other types of specialized processors, as well as base band processors used in transceivers to send, receive, and process wireless communications.

It should be noted that when a plurality of similar objects are depicted (e.g., FIG. 1 shows two sensors (110-1 and 110-2), the base number for that object can be used to refer to a general version of that object. Thus, if 110 is used to refer to a sensor it should be understood to be referring to sensors generally, and not to a particular depicted object.

It should also be noted that in this specification the term "predefined path" is used to describe the general case where the path of a vehicle is pre-planned. This can include a pre-planned path as defined by a vehicle supported and operating about one or more fixed tracks, such as railroad tracks for a train, or amusement park ride tracks for one or more cars or trains carrying riders. This can also include examples in which no fixed track exists, but the path of the vehicle is nonetheless pre-planned, such as that defined by a preprogrammed path or route of a self-driving vehicle about one or more roads.

Example Embodiments

An initial overview of technology embodiments is provided below, and then specific technology embodiments are described in further detail later. This initial summary is intended to aid readers in understanding the technology more quickly but is not intended to identify key features or essential features of the technology nor is it intended to limit the scope of the claimed subject matter.

The present disclosure sets forth a trusted accident avoidance control system for a vehicle, comprising a plurality of sensors operable to detect and measure one or more characteristics of at least one of a vehicle or a pre-defined path on which the vehicle is traveling; a first location determination component supported on the vehicle, and operable with one or more of the plurality of sensors to generate an estimated current position of the vehicle on the pre-defined path based on first sensor data; a second location determination component supported on the vehicle, and operable with one or more of the plurality of sensors to generate an estimated current position of the vehicle on the pre-defined path based on second sensor data; and an error correction component operable to generate an updated estimated current position of the vehicle on the predetermined path based on the first and second estimated current positions. Additional location determination components can be used, and can be operable to estimate a current position of the vehicle.

In one example, the error correction component can be operable with a path database to identify a predetermined threshold velocity for the updated estimated current position of the vehicle.

The trusted accident avoidance control system can further comprise a velocity management component operable to determine, based on the updated estimated current position, whether a current velocity of the vehicle exceeds the predetermined threshold velocity corresponding to the updated estimated current position, and to initiate an accident avoidance measure in accordance with a determination that the current velocity of the vehicle exceeds the predetermined threshold velocity.

The trusted accident avoidance control system can further comprise a jerk detection sensor operable to detect jerk-based differential inertial accelerations, and wherein the system is further operable to determine whether the detected jerk based differential inertial acceleration exceeds a predetermined differential inertial acceleration threshold, wherein the accident avoidance measure initiated is based on a determination that the jerk based differential inertial acceleration exceeds the predetermined differential inertial acceleration threshold.

The trusted accident avoidance control system can further comprise a zero-velocity vehicle condition as detected by at least one of a tachometer or an inertial measurement unit.

The trusted accident avoidance control system can further comprise a threshold velocity database comprising predetermined path section data associated with a plurality of respective path sections of the predetermined path, each respective path section representing a portion of the predetermined path, the path section data comprising path section identifier data and threshold velocity associated with the path section identifier data for operation of the vehicle across the respective path sections of the predetermined path, wherein the error correction component correlates a current position of the vehicle and a corresponding current path section of the predetermined path on which the vehicle is traveling, based on the updated estimated current positon of the vehicle on the predetermined path, with the predetermined path section data to identify the threshold velocity for the current path section.

The trusted accident avoidance control system can further comprise data corresponding to the current velocity of the vehicle received by the velocity management component, wherein the velocity management component correlates the predetermined threshold velocity for the current section of the predetermined path, associated with the updated estimated current position, with the current velocity of the vehicle to determine whether the current velocity of the vehicle exceeds the predetermined threshold velocity.

In one example, the velocity management component can be in communication with one or more vehicle operator notification systems, and wherein the accident avoidance measure can comprise a notification to an operator that the current velocity exceeds the predetermined threshold velocity, wherein the notification comprises at least one of a visual notification, an auditory notification, or a haptic notification In one example, the velocity management component can be in communication with a vehicle control system, and can be operable to send an automatic velocity reduction command to the vehicle control system, wherein the accident avoidance measure comprises an automatic reduction in the current velocity of the vehicle to below the predetermined threshold velocity.

The present disclosure also sets forth a computer-implemented method for trusted positive vehicle control for reducing the potential for accidents of a vehicle operating about a path, the method comprising estimating, using a first location determination component, a first estimated current position of a vehicle on a pre-defined path based on first sensor data; estimating, using a second location determination component, a second estimated current position of the vehicle on the predetermined path based on second sensor data; and calculating an updated estimated current position of the vehicle based on the first and second estimated current positions.

The method can further comprise determining, based on the updated estimated current position, whether a current velocity of the vehicle exceeds a predetermined threshold velocity corresponding to the updated estimated current position.

The method can still further comprise initiating an accident avoidance measure in accordance with a determination that the current velocity of the vehicle exceeds the predetermined threshold velocity.

It is noted that the trusted vehicle accident avoidance control system can comprise a single processor or any number of processors, as well as one or more memories that perform the processing functions of the entire system. For example, a single processor can be used to process data from the IMU, the aiding system, the error correction component, the velocity management component, and any other systems or components making up the trusted train derailment avoidance control system. As such, the term "component" can comprise hardware portions, software portions, or both depending upon how the trusted train derailment avoidance control system is designed and configured.

Unfortunately, there exists a large number of accidents involving trains (e.g., train derailments) that occur due to human error (e.g., lack of attention by the operator). The present disclosure and technology seeks to address this problem in a way that minimizes the infrastructure costs that are prevalent in existing prior systems, namely existing Positive Train Control (PTC) systems. The use of existing PTC systems is not widespread due to the high cost of implementing such systems. In addition, as discussed above, other problems and deficiencies with current or existing PTC systems (e.g., the vulnerability to being spoofed) make them less attractive as a viable solution to mitigate or reduce the number of train accidents. For instance, current PTC systems rely on communications with off board sensors (i.e., sensors not on board the train itself), thus subjecting these systems to potential security vulnerabilities that are not addressed. Essentially, the present technology provides a trusted train derailment avoidance control system that seeks to determine where a train is located on a fixed track, and whether or not the train is exceeding a safe speed for a given section of the fixed track, and to initiate a derailment avoidance measure to bring the train to an acceptable speed so as to prevent the train from possibly derailing from the fixed track. Derailment avoidance measures can be automated via positive control of the train's onboard control system to reduce the velocity or speed of the train, or they can include an alert to the operator that appropriate corrections are needed, namely a reduction in the velocity or speed of the train. Typically, an alert to the operator will be initiated first. In the event the alert is not acted upon within a given amount of time and the necessary corrections are not being made, the system can be configured to autonomously bring the train to a safe operating speed based on knowledge of the location of the train as determined by the system.

The present technology addresses the off board communication vulnerabilities by not relying on off board communication data to determine the current location, velocity, and/or acceleration of a train, or what may be considered an acceptable safe speed of the train. In addition, the present technology seeks to eliminate problems associated with unpredictable human error in a way that minimizes the infrastructure costs that are prevalent in all of the existing prior systems (including existing PTC systems).

The present technology is based on "dead-reckoning," or in other words, the integration of sensors that dead-reckon on an initial point or aiding. By using inertial type sensors (e.g., an inertial measurement unit and inertial navigation system) and other dead-reckoning sensors and associated aiding components, the trusted train derailment avoidance control system provides a reliable and trustworthy derived navigation or position solution of the train in real-time without relying on external sources (i.e., the systems and components of the trusted train derailment avoidance control system are supported on the train and are self-contained). It is recognized that one or more of the dead-reckoning sensors may be subject to error in the form of drift, and thus current measurements can be inaccurate to some degree depending upon the duration of time the drift is allowed to occur without being corrected. As such, the trusted train derailment avoidance control system further comprises one or more aiding components to help correct and control the drift, and to provide a continuously updated reliable derived current position solution. These aiding components are also "trusted" in that they are not readily compromised.

Indeed, it is noted that although some systems exist for determining a current location of an object based on outside signals (e.g., using signals from global positioning satellite system), these systems can be vulnerable to attacks by spoofed or disrupted signals that make any navigational positional reading unreliable. Thus, to achieve a safer solution, the trusted train derailment avoidance control system is configured to determine location data in a more trusted, reliable manner by eliminating reliance on outside or external devices, systems, measurements that are not based on different aspects, characteristics, or operational data related of the vehicle itself or the predetermined path. Specifically, the trusted train derailment avoidance control system relies on information generated in real-time from systems and components supported on the train itself, as well as on trusted, reliable predetermined or pre-surveyed information obtained and stored under controlled conditions, each of which can then be utilized in the trusted train derailment avoidance control system to greatly minimize the potential for accidents involving the train leaving or being caused to leave the fixed track.

Various advantages of the present technology over prior Positive Train Control (PTC) systems include, but are not limited to the self-contained and internal system dependent estimation of the location of the train on the fixed track and the correlation of the estimated current position and current speed of the train to a known and trusted track database comprising known, trusted pre-surveyed and established information to match the current positon of the train to data representing a stored location and to determine a threshold velocity or speed of the train for the given current position of the train. Another advantage includes the "dead-reckoning" approach that provides for a "trusted" position and velocity solution (i.e., the trusted train derailment avoidance control system is self-contained to the train and information is derived from the train or from aspects of the train or the predetermined path, information accessed is from known, trusted databases, no reliance is had on or communication received from outside components (such as GPS/GNSS signals), and the system is not subject to operator denial or override, human error, or deception/jamming/spoofing efforts).

While much of the discussion herein focuses on the safe operation of trains operating about a fixed track, it is contemplated that the present technology can be implemented on other types of vehicles, namely those operating about a predetermined path that can be considered similar to a train operating on a fixed railroad track. As such, aspects of the present technology are directed toward using, more generally, a trusted accident avoidance control system (wherein a trusted train derailment avoidance control system discussed below is of a specific type) operable to help prevent any type of vehicle operating about a predetermined path from inadvertently departing from or otherwise leaving or separating or deviating from the predetermined path. For example, as discussed above, a vehicle, such as a train, can be configured to travel a predetermined path as defined by the train operating about a fixed track or tracks. In this example, the trusted accident avoidance control system can be implemented to prevent the train from derailing from the track. In other examples, a vehicle, such as an automobile, can be configured to operate on and travel about one or more roads. The path of the vehicle can be predetermined or not, meaning in one aspect, a predetermined path of a vehicle can be in accordance with a fixed or pre-planned route of the automobile, such as with a self-driving automobile. In other aspects, the path may not necessarily be predetermined, but simply one or more roads that the vehicle can travel on. In this example, the trusted accident avoidance control system can be implemented to prevent the automobile from deviating from the path (e.g., a road, or a fixed or pre-planned route), even though the path is about a road and does not necessarily comprise a fixed track. One of the primary factors that determines whether a vehicle on a path will leave that path is the velocity of the vehicle. As such, one way to reduce the chance that the vehicle will experience an accident in which the vehicle departs from the path is to monitor the positon and speed of the vehicle and then to take measures to ensure it does not exceed a safe velocity at any given time along the path. However, for a given path, the safe velocity can vary depending on the position of the vehicle on the path, as well as the characteristics of the path at any given point. Thus, different sections of the path will have different acceptable safe velocities. As a result, the trusted accident avoidance control system (e.g., a trusted train derailment avoidance control system) is configured to determine the current position of the vehicle.

Generally speaking, the present technology sets forth a trusted accident avoidance control system, which in one example, incorporates an Inertial Navigation System (INS) (comprising an inertial measurement unit (IMU)) to produce an estimated current navigation solution (an estimated current position of the train). The trusted accident avoidance control system can further comprise one or more aiding systems or components operable or configured to provide information that aids in ensuring that the navigation solution used to determine the location of the vehicle and an acceptable current velocity is accurate. Each of the various components of the trusted accident avoidance control system are self-contained and operated so as to provide trusted solutions, as discussed more fully below.

No matter the type, the trusted accident avoidance control system can include two or more self-contained location determination components that attempt to estimate the current position of the vehicle. In some examples, one of the location determination components can comprise an inertial measurement unit (IMU) and inertial navigation system (INS) located on the vehicle. The IMU can include a plurality of sensors that measure the force and angular rate of the vehicle in which it is included. In some examples the IMU can include accelerometers and gyroscopes that measure this data. The IMU can use the acceleration, velocity and position and angular rate to estimate, based on a known initial position, the current position of the vehicle, particularly as correlated with an existing path signature database comprising data associated with the current predetermined path on which the vehicle is operating. The estimated current position generated by the IMU can be provided to the error correction component, such as for the purpose of being compared with an estimated current position from another location determination component, thus facilitating correction of any error or drift in the IMU.

In an example, one of the location determination components can comprise a tachometer or can access a tachometer. A tachometer measures the number of revolutions of a wheel of the vehicle and, using a known radius of the wheel, calculates the total distance traveled by the wheel (and therefore by the vehicle). The location determination component can then calculate the current position of the vehicle along the predetermined path, which current location can be provided to the error correction component.

In other examples, one of the location determination components can comprise a path correlation component (e.g., a specific type of path correlation component being a track correlation component as part of a trusted train derailment avoidance control system). The path correlation component measures (using one or more inertial based sensors, such as an accelerometer and gyroscope, which can be part of an inertial measurement unit) changes in the heading of the vehicle (e.g., a train) as it travels along the predetermined path. These changes in heading can be recorded in a database of the trusted accident avoidance control system. Over time, with several heading changes recorded, the recorded changes in heading can form a pattern of heading changes. The location determination component can access a correlation database comprising known and trusted data or information corresponding to a plurality of path heading changes associated with a plurality of predetermined paths, which information representing the path heading changes can be obtained by pre-surveying the plurality of predetermined paths. In one aspect, such a correlation database can be included in a more general path signature database or simply a path database (e.g., a track database), along with other track information, as part of the trusted accident avoidance control system. The location determination component can then compare the recently recorded heading changes to the pre-surveyed heading changes stored in the correlation database. The path correlation component can then identify a matching section of predetermined path and determine the current location of the vehicle, which estimated current position can be provided to the error correction component.

In other examples the location determination component can comprise a tag identifying component. The tag identifying component utilizes a sensor on the vehicle that can sense signals generated by tags embedded in or near the predetermined path (e.g., railroad tracks, road, and others). For example, the tags can be radio frequency identification tags that each transmit a signal including an associated identification code to one or more sensors on the vehicle (e.g., a radio signal receiver). When the one or more sensors on the vehicle senses or receives the radio signal from a tag, the identification code from that signal can be transmitted to the tag identifying component. The tag identifying component can then access a tag database of tag identification codes associated with a location as predetermined presurveyed and stored in the tag database. The tag identifying component can use the identification code to look-up the associated tag and determine the stored location of the sensed tag. The tag identifying component can estimate, based on the location of the sensed tag, the current location of the vehicle, which estimated current position can be provided to the error correction component.

In some still other examples, the location determination component can comprise a track analysis component. The track analysis component can identify features of a predetermined path, such as insulated joints in a fixed track. The track analysis component, comprising one or more sensors, can identify when the vehicle (e.g., a train or similar vehicle) travels over an insulated joint and can record the event in a database of the trusted accident avoidance control system. Over time the track analysis component can record a series of insulated joints that form a pattern, which pattern can be compared by the track analysis component to pre-surveyed or predetermined insulated joint data or information (e.g., patterned position and spacing of insulated joints from a plurality of tracks) in a known and trusted path feature database (e.g., which may comprise a standalone database, or be included as part of the path database) to determine if the recently stored pattern of insulated joints can be matched. Upon a match, the stored insulated joint positon or location data or information (information pertaining to the specific track on which this pattern of insulated joints is located, and the specific position on the track) associated with the matched pattern of insulated joints can be used by the track analysis component to determine an estimated current position of the vehicle, which estimated current position of the vehicle can be provided to the error correction component.

In still other examples, the location determination component can comprise a landmark determination component comprising one or more sensors operable to identify landmarks along the predetermined path the vehicle is traveling, such as by using cameras to receive and record visual data corresponding to landmarks (e.g., various types of objects) around the predetermined path in a database of the trusted accident avoidance control system. The recently recorded visual data can be compared to pre-surveyed or predetermined visual data or information corresponding to landmarks stored in a known and trusted landmark database, which database further comprises associated position information associated with the landmark information. The landmark determination component can estimate the current location of the vehicle based on how well the recently sensed and recorded landmarks match the stored landmarks and their locations from the landmark database, which estimated current position can be provided to the error correction component.

The trusted accident avoidance control system can include two or more of these location determination components. As a result, it can use the estimated current position generated from one location determination component to correct errors in the estimated current position generated from another location determination component. For example, an estimated current position from an IMU can include errors because of drift. The IMU and/or an error correction component can be configured to receive estimated current position information from another location determination component, such as a tachometer, for the purpose of using that location estimation to correct drift in the IMU's estimated current position data, as well as to provide a more accurate updated estimated current position of the vehicle for use in determining whether a current velocity is safe (does not exceed an established threshold velocity for that location).

Once the error correction component generates an updated estimated current position, it uses that updated estimated current position to identify a predetermined threshold velocity for the current position of the vehicle. To do so, the error correction component can access a known and trusted predetermined path (e.g., track, road, etc.) database that includes information corresponding to pre-surveyed, entered, or mapped locations on the predetermined path, as well as specific predetermined velocity thresholds for those locations of the predetermined path.

In some examples, the predetermined path (e.g., track) database includes data for a plurality of sections of the predetermined path for a plurality of paths (e.g., fixed tracks) at various geographical locations. For example, in the case of a fixed track or path for a train, a track section (which can also be described as a path section) represents a particular section of the fixed track or path. Each track section can include or be associated with, but is not limited to, information corresponding to a description of the location of the track section, information corresponding to a description of the length of the section, information corresponding to a description of any turns in that section, and information corresponding to a threshold velocity for that track section. Thus, once an updated current location is determined or generated, the trusted accident avoidance control system can retrieve from the path database the threshold velocity associated with that location. The same concepts can be applied to a road for an automobile, or any other type of predetermined path and associated vehicle.

In one example, the predetermined threshold velocity for any given location along a predetermined path can be based on a known legal speed limit, and can be utilized as such in the trusted accident avoidance control system. In another example, the predetermined threshold velocity can be determined by the trusted accident avoidance control system (e.g., a tachometer operating within this system) based on the characteristics detected, measured and determined as they pertain to the vehicle or the predetermined path, or both.

In some examples, the trusted accident avoidance control system can be configured and can operate to receive or to determine a current velocity of the vehicle. In one example, at least one of the vehicle or the trusted accident avoidance control system, or both, can include a speedometer to determine the current velocity. In another example, the velocity of the vehicle can be measured or derived in real-time using one or more speed sensors, such one or more inertial sensors (e.g., an MU), a tachometer, or any combination of these. Once known, the velocity management component can compare the current velocity with the stored predetermined threshold velocity based on the determined updated estimated current position of the vehicle. In accordance with a determination that the current velocity exceeds the predetermined threshold velocity, the velocity management component can initiate an accident avoidance measure, such as notifying an operator via one or more operator notification systems, or performing an autonomous or automatic accident avoidance measure, such as an automatic velocity reduction of the vehicle, and others.

The trusted accident avoidance control system can further be operable to determine a zero-velocity condition of the vehicle to provide aiding information. In one example, the zero-velocity condition can be measured or detected by an inertial sensor, such as an inertial measurement unit, and the corresponding information used to identify determine the position of the vehicle, and to correct drift in the inertial sensor. In another example, the zero-velocity condition can be detected by a speedometer or a tachometer on the vehicle. In one aspect, the drift in the inertial sensor could be measured and removed, or the position update could be disabled.

To further describe the present technology, examples are now provided with reference to the figures. With reference to FIG. 1, illustrated is a block diagram of various components of a vehicle 100 comprising a trusted accident avoidance control system 120 for reducing the risk of the vehicle 100 inadvertently departing or separating from, or otherwise leaving, a predetermined path on which the vehicle 100 is traveling, in accordance with an example of the present disclosure. As discussed above, the trusted accident avoidance control system 120 can comprise different types, depending upon the type of the vehicle and the type of predetermined path on which the vehicle is intended to operate. In one example, the trusted accident avoidance control system 120 can comprise a trusted train derailment avoidance control system (e.g., see FIG. 2) configured and operable to reduce the risk of a vehicle in the form of a train from inadvertently derailing from its predetermined path in the form of a fixed track (e.g., a railroad track). In another example, the trusted accident avoidance control system 120 can comprise an automobile accident avoidance control system configured and operable to reduce the risk of a vehicle in the form of an automobile from inadvertently leaving its predetermined path in the form of a series of roads, which predetermined path can be defined by a fixed or pre-planned and programmed route of the automobile.

The vehicle 100 can include or comprise (i.e., the vehicle 100 can have supported and operable thereon) the trusted accident avoidance control system 120, which itself can comprise one or more sensors (e.g., sensors 110-1 and 110-2), one or more location determination components (e.g., see location determination components 122-1 and 122-2), an error correction component 124, a velocity management component 126, a predetermined path database 130 (e.g., in some specific examples, one type of path database comprises a track database), and an operator notification system 160. The vehicle 100 can further comprise additional sensors (e.g., sensors 110-1 and 110-2, or others), a speedometer 140 (or other velocity/speed sensors capable of directly measuring velocity or deriving velocity), and a vehicle control system 150. Each of these systems and components are discussed below, and can be selectively and electrically communicatively coupled together, as appropriate, such that data can be transferred between them, as intended.

The trusted accident avoidance control system 120 can include two or more location determination components. As in the example shown, the trusted accident avoidance control system 120 can comprise a first location determination component 122-1 and a second location determination component 122-2, each supported on the vehicle 100. A location determination component can be any device that allows the trusted accident avoidance control system 120 to estimate a current location of the vehicle 100 traveling on a predetermined path. Example location determination components can be configured in a variety of ways, and can be operable with a variety of different types of sensors depending upon the manner in which location is to be determined. As such, example location determination components can comprise or can be operable with and utilize, namely to receive data from, one or more sensor types (e.g., one or both of 110-1 and 110-2) supported on the vehicle 100. In one example, at least one of the sensors 110-1 and 110-2 can be configured to sense and measure one or more characteristics of the predetermined path and/or the vehicle 100, movement of the vehicle 100, or a combination of these. In another example, at least one of the sensors 110-1 or 110-2 can be configured to sense and measure one or more objects embedded within, supported on, proximate, and/or surrounding the predetermined path, and others. In still another example, at least one of the sensors 110-1 or 110-2 can be configured to sense and measure an initial starting position of the vehicle 100, or the vehicle 100 at rest. Those skilled in the art will recognize still other possible sensor types and associated measureables, as well as recognize that the trusted accident avoidance control system 120 can comprise any combination of sensor types and measureables.

In one aspect, at least one of the location determination components 122-1 and 122-2 can comprise one or more electrical devices, including at least one or more processors and computer readable memory operable to perform one or more tasks for determining, or facilitating a determination of, an estimated current position of the vehicle 100. In another aspect, at least one of the location determination components 122-1 and 122-2 can comprise a software component executable on a shared computer (e.g., one including a processor and computer readable memory) of the trusted accident avoidance control system 120. Indeed, it is contemplated that, in one example, the trusted accident avoidance control system 120 can comprise a single computer having sufficient processing capabilities (e.g., one or more processors and one or more memories) to execute the software code of one or more of the error correction component 124, the one or more location determination components 122-1 and 122-2, the velocity management component 126, and any other component or system in the trusted accident avoidance control system 120. Alternatively, one or more of these can comprise a stand-alone device able to communicate with any of the other devices in the system, with a stand-alone computer, with the computer of the vehicle, as will be recognized by those skilled in the art.

Regarding specific types of location determination components, in one example, one of the first or second location determination components 122-1 or 122-2 can comprise an inertial measurement unit as part of an inertial navigation system supported on the vehicle 100. An inertial measurement unit can include or can otherwise access sensors (e.g., sensor 110-1 or 110-2, or both), which can include one or more accelerometers and one or more gyroscopes. Using data from these sensors, the inertial measurement unit can estimate a current position of the vehicle 100 (e.g., the inertial measurement unit can identify a specific force and direction over a specific time period, and determine an initial known starting point.

In another example, one of the first or second location determination components 122-1 or 122-2 can comprise a tachometer supported on a ground contacting locomotion device (e.g., a wheel, endless track) of the vehicle 100 (preferably a non-drive wheel to eliminate error due to slippage that may otherwise occur on a drive wheel). The tachometer can be configured to measure the number of revolutions of the wheel of the vehicle 100 in accordance with different parameters, such as during a given period of time, between two points on the predetermined path, or from an initial starting point. Then, using a known circumference of the wheel, the tachometer (or an associated processor configured for the task and in communication with the tachometer) can calculate the total distance traveled by the wheel for the given measured parameter using the formula: number of revolutions of the wheel*circumference of the wheel=total distance traveled by the vehicle 100. Based on this, the tachometer can determine an estimated current position of the vehicle 100 traveling along the predetermined path. For example, the tachometer can determine an estimated current position of the vehicle 100 based on the calculated total distance traveled from the initial starting point. An example of a type of tachometer that can be incorporated into the trusted accident avoidance control system is a hall-effect wheel/axle-based tachometer/odometer circuit, such as a Baumer railway speed sensor (MTR Series). However, this is not intended to be limiting in any way as it is contemplated that other types of tachometers can be used in the trusted accident avoidance control system 120, as will be apparent to those skilled in the art. Once determined and generated, the estimated current positon of the vehicle 100 can be provided to the error correction component, such as for the purpose of being compared with an estimated current position from another location determination component to facilitate an updated current location of the vehicle 100. In the event the tachometer is being operated in conjunction with an inertial sensor, such as an inertial measurement unit, the estimated current position provided by the tachometer can facilitate correction of drift within the inertial sensor, and can be referred to as supplemental position data, a type of aiding information, as discussed below.

Tachometer sensor counts for known distances can be assessed using pre-surveyed locations. However, these are subject to various acceleration and/or braking events by the vehicle 100 that can induce slippage in the wheel being sensed by the tachometer, thus introducing errors in the measurements. However, errors can be minimized when the tachometer counts are calibrated to the known distances. Moreover, tachometer sensor counts can be determined and stored between known locations (e.g., known insulated joints, tags, etc. and their locations, which can be stored in a database), and an estimated current position of the vehicle 100 can be determined by operating the tachometer and counting the revolutions as measured from any of the known locations. Typically, a tachometer will generate several counts per revolution of a wheel (e.g., 300 counts per revolution) so as to maintain accuracy in the event of, and to account for, partial revolutions. For example, it may be known that, for a given wheel size, that there are 10,000 revolutions between a first known (e.g., know latitude and longitude as predetermined or pre-surveyed) location and a second known location. As such, once the vehicle 100 crosses the first location, the number of revolutions, or partial revolutions, based on the measured counts as measured from that location can provide an estimated current position of the vehicle 100 at any positon along the predetermined path from the first known location, and between the first and second known locations.

In another example, the predetermined path can be pre-surveyed to comprise a plurality of known measurement points (similar to the measurement points shown in FIG. 5, and discussed below), which can be any distance (e.g., an arbitrary distance) apart from one another. The pre-survey can further comprise identifying or determining the location of each of the measurement points (e.g., latitude, longitude), as well as measuring the distance between each of the measurement points (e.g., using an odometer, tachometer or other distance measuring device on the surveying vehicle). The measurement points can be defined arbitrarily, or by items or objects associated with the predetermined path (e.g., insulated joints, tags, and others in a fixed track, such as a railroad track). The information representing the distance between these (distance data), as well as the information representing the position of each of the measurement points (position data), can be stored in a database, such as the path database 130. This same pre-survey can be carried out for a number of different predetermined paths, and the respective corresponding position and distance information can be stored in the path database 130. Upon currently operating a vehicle (e.g., vehicle 100) about a current predetermined path, the trusted accident avoidance control system 120, and particularly a tachometer operating as one of the first or second location determination components 122-1 or 122-2, can be operated to determine from one measurement point to the next the distance traveled by the vehicle 100 based on the number of wheel revolutions (and fractions thereof) measured. For example, sensors on the vehicle 100 can be deployed that can detect when the vehicle 100 crosses an insulated joint (a first insulated joint). The tachometer can begin measuring and recording the number of revolutions of the corresponding wheel of the vehicle 100 associated with the tachometer until the next item or object (e.g., insulated joint (a second insulated joint)) is encountered and sensed, upon which the trusted accident avoidance control system can, using a computer, calculate the distance between the first and second insulated joints (number of wheel rotations*diameter of the wheel*n). This distance can be recorded. This process can be repeated for each successive insulated joint (or other object or item) in order to establish a pattern or series of recorded distances between a plurality of successive insulated joints in the predetermined path. At any time, the pattern of recorded distances (distance data) can be compared to the path database 130 and the pre-surveyed distance data or information stored therein to determine a match. If the recently recorded pattern of distance data can be matched to a stored pattern of distance data, then an estimated current position of the vehicle 100 can be generated based on this comparison. It is noted that there may be some degree of error in the distance calculations from the measurements of the tachometer due to slippage or wear in the wheel. This error can be periodically analyzed and updated as often as needed or desired so as to be minimized. Once the estimated current position of the vehicle 100 is initially determined and known, the tachometer can be operated to continue to measure wheel revolutions from the last known insulated joint. From this, additional estimated current positions of the vehicle 100 can be determined based on the distance from the last known insulated joint, including positions between insulated joints. Moreover, once the estimated current position of the vehicle 100 is initially determined, upcoming insulated joints (i.e., insulated joints not yet reached by the vehicle 100) and their locations can be known (from the stored database). Based on this, additional estimated current positions of the vehicle 100 can be obtained based on the distance from the last known insulated joint (an estimated current position of the vehicle 100 between two insulated joints can be interpolated based on the last known location of the last insulated joint).

In another example, the tachometer can be used to verify that the vehicle 100 is not moving (a zero-velocity condition). This zero-velocity condition can be communicated to the error correction component to update one of the location determination components 122-1 or 122-2, or both.

The tachometer can also be used as a speed sensor to obtain a current velocity or speed of the vehicle 100. Specifically, the tachometer can be operated and a current velocity of the vehicle derived from the measurements obtained from the tachometer, as known in the art.

In another example, one of the first or second location determination components 122-1 or 122-2 can comprise a path correlation component (e.g., a fixed track correlation component operable on a train). The path correlation component can be configured to measure (using inertial sensors, such as an accelerometer and a gyroscope, which can be part of an IMU) changes in the heading of the vehicle 100 due to one or more turns in the predetermined path. For example, a change in heading can be detected by measuring angular acceleration using an accelerometer and direction of movement using a gyroscope. Each current change of heading can be recorded and stored in a database, along with the length of time the vehicle 100 travels in the given direction. For example, the vehicle 100 can travel north for a given duration of time or for a given distance, then can turn northeast for a given duration of time or for a given distance, and then can turn southeast for a given duration of time or for a given distance. These combinations of direction and duration and/or distance comprise heading change data, and can form a pattern of travel. The path correlation component can then compare the recently stored heading change data and its associated pattern of travel to a correlation database that includes heading change data corresponding to pre-surveyed or predetermined heading changes for any number of predefined paths (e.g., any number of available fixed tracks, such as railroad tracks). The pre-surveyed heading change data, which can include direction and duration and/or distance data pertaining to the heading changes stored in the correlation database, can further be associated with heading position or location information, such as the specific path and/or coordinate information (e.g., latitude, longitude). In essence, the path correlation component can identify a match of heading change data, and can retrieve the location information associated with the matched stored heading change data to determine the current location of the vehicle 100 about the predetermined path based on the match of the heading change data and the associated position data. The path correlation component can then provide the estimated current position to the error correction component, such as for the purpose of being compared with an estimated current position from another location determination component to facilitate generation of an updated current location of the vehicle 100 by the error correction component. In one aspect, the comparison of data corresponding to the recently stored current heading changes to the heading change data stored in the correlation database can begin with the recording of a single current heading change, and continue for any number of current heading changes until a match is determined. Obviously, the larger the number of heading changes in the pattern of heading changes, the faster the system will be able to obtain a reliable estimated current positon solution of the vehicle 100. Indeed, each additional change in heading can increase the path correlation component's ability to identify the current path section as more data contributes to the likelihood of an accurate position determination. Once enough heading changes are made to determine a match, the path correlation component can retrieve the position information associated with the last heading change to generate the estimated current position of the vehicle 100. In another aspect, the comparison of recently recorded and stored heading change data can comprise comparing heading change data corresponding to a plurality of heading changes to a plurality of stored heading change data in the correlation database. In this instance, the comparison would not be made until a pattern or series of heading changes is obtained. Once at least two current heading changes are encountered, the path correlation component can attempt to make a comparison and to determine a match. However, as the correlation database provides heading change data for a plurality of predetermined paths, a match with only two heading changes in the pattern is not likely. Indeed, a larger number of heading changes in the pattern will result in a more likely match being made, wherein, if a match is determined, the last heading change in the series of heading changes in the correlation database can be retrieved to provide the current estimated positon of the vehicle 100. In the event the path correlation component is being operated in conjunction with an inertial sensor, such as inertial measurement unit, the estimated current position provided by the path correlation component can facilitate correction of drift within the inertial sensor, and can be referred to as supplemental position data, a type of aiding information, as discussed below.

In another example, one of the first or second location determination components 122-1 or 122-2 can comprise a tag identifying component, which can be operable with and utilize one or more sensors (e.g., one or both of 110-1 and 110-2) on the vehicle 100 that can sense one or more tags previously embedded in or near the predetermined path. For example, the tags can be radio frequency identification tags that each have tag identification data associated with them, such as an associated identification code previously assigned. In one aspect, the tags can be radio transmitters that actively transmit an identification code (e.g., using a power source to constantly transmit the code). In another aspect, the tags can be radio transmitters that passively transmit an identification code (e.g., only transmitting when receiving power from a sensor that is nearby). As the vehicle 100 travels on the predetermined path, the sensor(s) 110-1 and/or 110-2 can detect and identify one or more tags by receiving data from the detected one or more tags that includes the identification code for those tags. The tag identifying component can then access a known and trusted tag database (e.g., the tag database can be part of path database 130, or a separate, standalone database) of pre-surveyed or predetermined tag identification codes. Each of the predetermined and stored tag identification codes can be associated with position or location information, such as information pertaining to their coordinates (latitude, longitude). The tag identifying component can use the identification code from the detected and identified tags to match that to corresponding tag identification codes from the tag database. Upon a match, the tag identifying component can retrieve the associated location and thus determine the current location of the vehicle 100. As an example, and with respect to a vehicle 100 traveling on a predetermined path having RFID tags embedded therein, the tag identifying component receives tag identification data from a sensor in the form of a RFID receiver having sensed a tag, such one with the identification code 001292, thus indicating that the vehicle 100 recently crossed that RFID tag along the predetermined path. The tag identifying component can then access and use the tag database to retrieve the tag location data associated with that particular tag identification code by cross-referencing and matching the tag identification code to a corresponding or matching tag identification code from the plurality of tag identification codes stored in the tag database, thus generating an estimated current position of the vehicle 100 when it sensed tag 001292. The tag identifying component can then provide the estimated current position to the error correction component, such as for the purpose of being compared with an estimated current position from another location determination component to facilitate an updated current location of the vehicle 100. In the event the tag identifying component is being operated in conjunction with an inertial sensor, such as inertial measurement unit, the estimated current position provided by the tag identifying component can facilitate correction of drift within the inertial sensor. This same process can happen continuously and in real-time as the vehicle 100 is traveling along the predetermined path, or it can be periodically initiated.

In another example, one of the first or second location determination components 122-1 or 122-2 can comprise a path feature detection component. The track analysis component can identify features of a predetermined path on which the vehicle 100 is traveling. In one example, the predetermined path can comprise a track and the features to be identified can comprise insulated joints between the several rail pieces making up the track. It is noted that joints are used to connect the separate rails or rail pieces in a track and insulated joints are separate sections of track that include track circuits. Thus, if sections of tracks are being used to transmit communication signals, insulated joints function to separate sections of track that need to be electrically distinct by blocking the transmission of signals through the insulated joint. The track analysis component can be operable with and utilize sensors that can identify when the vehicle 100 (in this case a train or similar vehicle) travels over an insulated joint and can record the event in a database of the trusted accident avoidance control system 120. In one example, the sensors operable to detect an insulated joint can comprise a variable reluctance sensor that functions as a magnetic pickup, and that comprises a coil of wire wound around a permanently magnetized probe or shaft. When ferromagnetic objects pass over this inductive coil, the flux density is modulated creating analog voltage spikes in the coil. In another words, each passing discontinuity into the inductive probe produces a resultant voltage spike. In one example, one or more variable reluctance sensors can be installed on one or more railroad cars and positioned, such that the inductive probe faces the rails which are separated by the polymer (non-conducting) insulators. The ferromagnetic objects are the individual long rail pieces or the railroad track, and the discontinuity is created by the periodic insulated joints.

Over time the track analysis component senses and stores a series of events (e.g. each time an insulated joint is detected) that form a pattern, which pattern can be based distance traveled between each insulated joint. In one example, distance can be measured using a tachometer (see discussion above for this example). In another example, the distance between the insulated joints can be derived based on the duration of time it takes for the vehicle 100 to travel between each pair of insulated joints, and the average velocity of the vehicle 100 during those times. Once determined, this pattern information can be recorded and stored in a database. The track analysis component can then compare the recently stored pattern of events against a known and trusted path feature database (e.g., which can be a standalone database, or part of the path database 130) comprising pre-surveyed or predetermined data corresponding to the location and pattern of insulated joints for a plurality of known tracks, and can try to determine a match. Indeed, the path feature database can comprise location information corresponding to each insulated joint in a predetermined path, as well as information corresponding to the distance between adjacent or successive insulated joints. In the event a matching section of track is identified (e.g., the currently recorded pattern of distances between the currently sensed insulated joints matches a pattern of stored distances between insulated joints for a given predetermined path), the track analysis component can determine an estimated current position of the train based on the match, and the position information associated with the matched pattern of stored insulated joints. The track analysis component can estimate the current position of the train based on how well the stored pattern of insulated joints matches known sections of the track. The reliability of the track analysis component and the determined estimated current position can increase as more insulated joints are detected and more data points are added to the pattern. The estimated current position generated by the track analysis component can be provided to the error correction component, such as for the purpose of being compared with an estimated current position from another location determination component to facilitate an updated estimated current position of the train. In the event the path feature detection component is being operated in conjunction with an inertial sensor, such as inertial measurement unit, the estimated current position provided by the path feature detection component can facilitate correction of drift within the inertial sensor, and can be referred to as supplemental position data, a type of aiding information, as discussed below.

It is noted that the path feature detection component discussed above can be operated with sensors capable of detecting other features in a predetermined path, and that the discussion pertaining to insulated joints is not intended to be limiting in any way. Indeed, as will be recognized by those skilled in the art, other features that may be present in or on a predetermined path and that can be sensed by one or more sensors for the purpose of being used to determine an estimated current position of the vehicle via the path feature detection component. For example, steel shafts could be embedded in the wooden railroad cross members at specific repetitive intervals. The wooden cross members can be drilled and the shafts inserted, such that the shaft head is flush or is slightly protruding from the surface of the cross member. The shafts can be any size, such as on the order of 1-2 inches in diameter. A sensor in the form of one or more magnetic pickups can positioned under one or more designated rail cars of the train, and the inductive probe face mounted to pass squarely over the embedded steel shaft heads as the train travels along the track. In this manner, analog voltage spikes will generated from the inductive magnetic pickup on a known, repetitive basis. In another example for creating data position data pulses, cylindrical magnets can be embedded into the wooden track cross members. The wooden track members can be drilled out and the magnets can be pressed or otherwise secured (e.g., with an adhesive or some type of mounting hardware) into the drilled holes. A Hall Effect sensor can be positioned along the bottom side of the rail car, such that each passing of an embedded magnet will pass squarely under the magnetic pickup sensor. Generally speaking, a hall effect sensor is used to measure the magnitude of a magnetic field, with the output of this type of sensor being an analog voltage signal proportional to the magnetic field strength. In still another example, the system can detect other know rail infrastructure landmarks like intersection switches, as well as embedded supplemental active or passive RFID tags (as described earlier) or similar transponder mechanisms (all of which can be installed and operated in a trusted manner). Each of these are contemplated herein.

In another example, one of the first or second location determination components 122-1 or 122-2 can comprise a landmark identification and determination component (hereinafter landmark determination component). The landmark determination component can comprise, or can be configured to be operable with and utilize, one or more sensors (e.g., one or both of sensors 110-1 and 110-2) to identify various landmarks along the predetermined path on which the vehicle 100 is travelling. In some examples, the one or more sensors can comprise one or more cameras supported on the vehicle 100, and the landmark determination component can be operable to receive visual or image data corresponding to the various landmarks captured by the camera(s). The captured visual data can be recorded or stored in a database over any duration of time. In some examples, the visual data can be analyzed to identify particular landmarks visible from the vehicle. The landmark determination component can then compare the recently stored visual data to pre-surveyed or predetermined landmark information and data associated with known landmarks as associated with certain paths, and sections of these, stored in a landmark database, which comparison can be for the purpose of determining a correlation or match of the recently recorded image data with that stored in the landmark database. The landmark database can be a standalone database, or it can be part of the path database 130. The landmark database can further comprise location or position information associated with the stored landmark data. The landmark determination component can estimate the current position of the vehicle 100 on the predetermined path based on how well the sensed landmarks match the known landmarks and their location on the predetermined path. The estimated current position of the vehicle 100 generated by the landmark determination component can be provided to the error correction component 124, such as for the purpose of being compared with an estimated current position of the vehicle 100 generated from another location determination component to facilitate an updated current location of the vehicle 100. In the event the landmark determination component is being operated in conjunction with an inertial sensor, such as inertial measurement unit, the estimated current position provided by the landmark determination component can facilitate correction of drift within the inertial sensor, and can be referred to as supplemental position data, a type of aiding information, as discussed below.

It is noted that the quality or reliability of the location estimation provided by the location determination component(s) increases as additional data points are gathered. For example, in the case of a train traveling a fixed track having insulated joints, when the sensors on the train and the associated location determination component first detect and identify an insulated joint, no match is possible. However, when a second insulated joint is detected and identified (e.g., 1.3 kilometers later), the location determination component matches the current pattern (e.g., two insulated joints 1.3 kilometers apart) with data representing several possible known tracks having track sections that match that particular pattern as stored in the path feature database. When a third insulated joint is detected and identified (e.g., 0.4 kilometers later), the location determination component matches this now current pattern (e.g., two insulated joints 1.3 kilometers apart, and another insulated joint 0.4 kilometers apart from that) with remaining possible known tracks having track sections that match that particular pattern in the path feature database, thus further narrowing the possible actual matches. Thus, the location determination component is further able to narrow the match, eliminating any previous possible matching tracks and sections of track that do not include a third insulated joint 0.4 kilometers after the second insulated joint. As the train continues its travel along the track and as each detected insulated joint is added to the pattern, the number of matching tracks and track sections is further reduced until only one possible match remains. At this point, the track analysis component can identify with relatively high certainty the position of the train along the track. Although the example provided above discusses the frequency of additional data points and how these can increase of reliability of the estimated current position generated as pertaining to the path feature detection component and the measurement of insulated joint, this same principle can be applied to other location determination components in the trusted accident avoidance control system 120, as will be apparent to those skilled in the art.

It is noted that the trusted accident avoidance control system can be configured to receive initial input, such as an input communicating to the system which predetermined path the vehicle is traveling on, thus simplifying the matching process to only sections of the predetermined path. This initial information can be input by the operator or by a central dispatch, if available.

Once obtained, the first location determination component 122-1 and the second location determination component 122-2 can each be configured to transmit an estimated current position to the error correction component 124. The error correction component 124 can be configured to receive and use the estimated current position from the first location determination component 122-1 and the estimated current position from the second location determination component 122-2 to correct any errors in either of these location solutions, and to generate a more reliable updated estimated current position to be used in comparing to stored locations in a trusted database associated with threshold velocity information. For example, if the first location determination component is an inertial measurement unit, the estimated current position may include a small amount of error (also known and referred to as drift) that can be introduced as a result of a small amount of noise in the accelerometers and the gyroscopes. To account for and correct this error, the error correction component 124 can use the estimated current position from the second location determination component 122-2. For example, if the second location determination component 122-2 is operable to determine an estimated current position based on the detection of one or more tags embedded in the predetermined path and the comparison of these to predetermined tag identification and location information stored in a tag database, as discussed herein, this estimated current position solution will typically be highly reliable as it is based on currently sensed or detected tags to obtain associated data that is cross-referenced with predetermined data in the tag database that is both known and trusted. This estimated current position can then be communicated to the error correction component 124 to provide a reliable, location solution. This estimated current position can be continuously and iteratively determined and provided based on the continued sensing of one or more tags, and the comparing of these to the tag database (e.g., which database can be a standalone database, or part of the path database 130) of tag identification codes with associated locations (or based on the continued use of any of the other types of location determination components discussed herein). The error correction component 124 can then use this reliable estimated current position to correct any drift in the measurements and estimates provided by the inertial measurement unit to generate an updated estimated current position. In addition, the updated estimated current position information can be transmitted back to the inertial measurement unit, so it has a more accurate position estimate going forward (i.e., facilitation of ongoing recalibration of the inertial measurement unit). In addition, the Kalman filter maintains a statistical quality determination (in the form of the estimate statistical quality) of all the kinematic parameters (including position, velocity, and acceleration) that can be used to validate all comparisons.

Generally speaking, it is noted that each position update provides an additional observation that can be used as an input to the error correction component 124 (e.g., a Kalman Filter or similar estimation algorithm). The error correction component 124 can take in a full (and ultimately redundant) set of observations, and generate an estimate which minimizes error for all of the measurements in a least-squares sense (or similar error cost function). These multiple observations coupled with the appropriate dynamic model (e.g., Kalman filter linear dynamic model) minimizes the error associated with the position, velocity, and acceleration of the vehicle. In a typical Kalman filter or similar statistical estimator, each measurement input has an associated measurement variance. This specifies the statistical quality of each individual measurement. The statistical "optimal estimation algorithm" (i.e. Kalman Filter) then applies a linear dynamic model (which models the kinematic dynamic process) and combines the measurements in a manner that minimizes the statistical error of the final estimate. Location solutions and other aiding information are prioritized by their measurement model uncertainty.

It is noted that in one example, the first location determination component 122-1 can comprise the error correction component (e.g., see first location determination component 122-1 comprising an error correction component 124 shown in dotted lines), or in other words, error correction capabilities. As such, the second location determination component 122-2 can be configured to be in communication with the first location determination component 122-1, wherein the first location determination component 122-1 receives an estimated current position of the vehicle 100 generated by the second location determination component 122-2, wherein the generation of an updated estimated current position of the vehicle can take place in the first location determination component 122-1. An example first location determination component 122-1 comprising an error correction component or error correction capabilities can be an inertial measurement unit having a Kalman filter. In another example, the error correction component 124 can comprise a standalone component (e.g., a standalone Kalman filter), such that both a first location determination component and a second location determination component can be configured and operated to send estimated current positions to the error correction component, which uses both estimated current positions to generate an updated estimated current position and to correct for any error in one or both of the first and second location determination components.

Once the updated estimated current position for the vehicle 100 on the predetermined path is determined, which comprises a more trusted and accurate location solution of the vehicle 100 over the initial first and second location solutions generated by the first and second location determination components 122-1 and 122-3, the location data representing the updated estimated current position for the vehicle 100 can be utilized by the error correction component 124 to access, communicate with and leverage the path database 130. Indeed, the error correction component 124 can use the updated estimated current position to correlate or match the location data representing the updated estimated current position with predetermined location data stored in the path database 130, which stored location data can be associated with data representing a predetermined portion or section of the predetermined path identifiable by the error correction component 124. A portion or section of the predetermined path can be defined by a curve, a turn, a straightaway, a hill, or any other identifiable portion or section. It is noted that the path database 130 can comprise location data and associated path section data for a plurality of different predetermined paths and respective path sections.

The path database 130 can further comprise predetermined velocity data (e.g., threshold velocity data) associated with the location data and/or the path section data, which velocity data represents a velocity that the vehicle 100 should not exceed when traveling on a respective path section. In one aspect, the velocity data can represent a maximum threshold velocity. In some examples, the threshold velocity can be known, and based on the legal requirements for velocity on the path section(s) along the predetermined path. In other examples, the threshold velocity can be based on predetermined velocity restrictions or limits to safely travel the predetermined path along the various path sections. In one aspect, such restrictions can be based on one or more characteristics pertaining to a particular vehicle intended to operate on the predetermined path, such as, but not limited to, the type of vehicle, the weight of the vehicle, the center of gravity of the vehicle, the type of load being carried by the vehicle, and others as will be recognized by those skilled in the art. In another aspect, other restrictions can be based on possible conditions of the track, such as those that may be temporary due to inclement weather. Those skilled in the art will recognize still other bases for possible restrictions of the predetermined threshold velocity. This information can be predetermined and stored in the path database 130 once it is determined. For example, characteristics of a particular vehicle can be known prior to departure. In addition, current environmental and other conditions (e.g., weather conditions) can be known prior to departure. Thus, appropriate associated threshold velocities for respective path sections that permit safe passage of the vehicle 100 in light of these can already be predetermined and stored in the path database 130. In another example, a known radius of a turn in a particular section of a predetermined path, along with a threshold angular acceleration determined by an inertial sensor, can be used to calculate a safe velocity for the vehicle during that turn. In another example, the trusted accident avoidance control system 120 can facilitate selection of a percent reduction in threshold velocity from, for example an established legal speed limit, based on known conditions or characteristics of the vehicle 100. Thus, for example, a vehicle that is known to be some amount or percentage heavier when carrying a load than when empty, can be operated in a threshold velocity reduction mode that functions to reduce the threshold velocity identified and retrieved from the path database 100 by any given percent determined to be safe for the vehicle, as loaded. Or, inclement weather can cause execution of the threshold velocity reduction mode. When in this mode, the percent reduction in velocity can be applied to all instances where a threshold velocity is retrieved from the path database 130.

The error correction component 124 operates to correlate the data representing the updated estimated current position with the stored location data in the path database 130 to determine a match. In the event a match is determined, meaning that the updated estimated current position of the vehicle 100 is matched with a location in the path database 130, the error correction component 124 can identify the corresponding and associated path section that is representative of the portion or section of the predetermined path on which the vehicle 100 is identified as currently traveling, which path section includes the current location of the vehicle 100 on the predetermined path. In addition, the error correction component 124 can retrieve from the path database 130 an associated threshold velocity for the particular identified path section.

As discussed herein, the error correction component 124 can be configured to determine an acceptable threshold velocity for a given section of path of the predetermined path on which the vehicle 100 is currently traveling. Once an acceptable threshold velocity for a given section of path of the predetermined path is determined and retrieved, this information can be communicated to or otherwise retrieved and utilized by the velocity management component 126. In addition, the velocity management component 126 can receive data representing a current velocity of the vehicle 100, where the current velocity can be compared to the retrieved threshold velocity. In one example, the current velocity data can comprise data from a speedometer 140 on the vehicle 100. In another example, the current velocity data can be derived from measurements taken by a tachometer on the vehicle 100, or from measurements from an inertial sensor, such as an inertial measurement unit. Upon receiving the current velocity, the velocity management component 126 can compare the current velocity to the determined threshold velocity to determine whether or not the current velocity exceeds the threshold velocity. If the current velocity exceeds the threshold velocity, the velocity management component 126 can initiate an accident avoidance measure (e.g., a train derailment avoidance measure) by transmitting a command signal to the operator notification system 160, the vehicle control system 150, or both, which command signal causes an action to be taken to reduce the velocity of the vehicle 100, or which causes an action to facilitate a reduction in the velocity of the vehicle 100. In most cases, the operator of the vehicle 100 would first be notified of an over speed condition detected by the trusted accident avoidance control system 120, thus allowing the operator to take any necessary corrective action. This can occur prior to the velocity management component 126 initiating an autonomous avoidance measure or solution via the vehicle control system 150 to bring the vehicle 100 to a safe speed, or to stop the vehicle 100, based on the current conditions. On the other hand, if the current velocity of the vehicle 100 does not exceed the threshold velocity, then no action is taken by the accident avoidance control system 120 as the current velocity represents an acceptable one.

In some examples, once an updated estimated current position is determined and a location match made, the error correction component 124 can be configured to identify one or more upcoming track sections and retrieve the threshold velocity for each upcoming track section, thus facilitating ongoing and predictive velocity determination and active control of the vehicle 100 for continued safe operation of the vehicle 100 as it approaches and enters different sections of the predetermined path. Indeed, by determining an accurate current location of the vehicle 100 on the predetermined path, not only can the error correction component 124 retrieve an associated threshold velocity for the current section of the predetermined path, but one or more upcoming sections can be known and the velocity threshold for those upcoming sections retrieved. The trusted accident avoidance control system 120 can utilize this information for a variety of purposes, as discussed, including to facilitate smooth transitions from one velocity or speed of the vehicle 100 to another velocity or speed as the vehicle 100 progresses along the predetermined path and as the vehicle 100 enters different sections of the predetermined path.

The path database 130 can further include location and velocity data for a plurality of predetermined paths, wherein each predetermined path can be subdivided into a plurality of track or path sections, each having an associated threshold velocity. In other examples, the path sections can be associated with data that describes the physical features of or relating to the path sections, including, but not limited to, the radius of any turns in the path section, any changes in velocity, any known hazards, and others as will be recognized by those skilled in the art. These too can be used by the error correction component 124 to identify and match a specific portion or section of a predetermined path. Still other types of data can be included in the path database 130 as will be apparent to those skilled in the art, which data can be communicated to the error correction component 124. For example, as taught herein, the trusted accident avoidance control system 120 can comprise a number of different types of location determination components operable to access and retrieve pre-surveyed or predetermined information from corresponding databases associated with each respective location determination component in order to generate an estimated current position of the vehicle 100. The stored information utilized by each of the various and respective location determination components discussed herein can be stored in individual respective databases, in a combination of databases, or in the path database 130. Indeed, the path database 130 can further include any combination of the other databases and stored information discussed herein (or more precisely their data), such as, but not limited to, the correlation database, the tag database, the path feature database, the landmark database, and any others. Alternatively, these can be combined in any combination into one or more stand-alone databases separate from the path database 130.

Regarding the situation where the current velocity of the vehicle 100 exceeds the retrieved threshold velocity and the velocity management component 126 initiates an accident avoidance measure, in one example, the accident avoidance measure can comprise a signal or notification sent to an operator notification system 160 on the vehicle 100 operable to notify the operator of the breach of the current velocity of the vehicle 100 over the acceptable threshold velocity for the given current location of, or path section on, the predetermined path (i.e., the avoidance measure can comprise notifying the operator via the operator notification system 160). The operator notification system 160 can include one or more systems or devices operable to present information to an operator of the vehicle 100, which information can comprise and be in the form of visual, audible, haptic or other types or any combination of these. For example, the operator notification system can comprise, but is not limited to, a display (e.g., a display screen), an acoustic transmission or broadcast device (e.g., a speaker), a haptic feedback device (e.g., a vibrating or other haptic feedback device associated with a throttle, seat or other operator physical object in which the operator interfaces with the vehicle 100), or others, or a combination of these. In one aspect, the notification can comprise a warning, indicating that the vehicle's current velocity exceeds the threshold velocity. In another aspect, the notification can comprise, or further prompt and instruct, the operator to reduce the vehicle's velocity to or below the threshold velocity. The actual perceived notification can comprise a visual notification (e.g., warning and prompt on a display screen), an audio notification (e.g., warning and prompt through one or more speakers) that generates an audible audio notification that informs the operator of the over speed condition and that the current velocity should be reduced, a haptic notification (e.g., a vibration via a vibrating device associated with the controls or other operator interface object/device of the vehicle 100) that generates a haptic response informing the operator of the over speed condition, or any combination of these. The velocity management component 126 can be configured to cause the notification to persist on a continuous or periodic basis until the current velocity of the vehicle 100 is brought to or below the determined threshold velocity. In the case of a notification, the operator will likely carry out the reduction in velocity by manipulating the vehicle control system 150 to achieve an acceptable velocity. Once the vehicle is brought to an acceptable velocity below the threshold velocity, the operator notification can be caused to cease.

In another example, the accident avoidance measure can comprise an automatic or autonomous reduction in the velocity of the vehicle 100 to or below the determined threshold velocity. In one example, the velocity management component 126 can be operable to communicate with the vehicle control system 150 of the vehicle 100. The vehicle control system 150 can be an onboard system of the vehicle 100, and can comprise one or more mechanisms or systems (e.g., computer, mechanical (e.g., throttle or throttle control), or a combination of these), as well as various electronic and computer systems operable with these, operable to control or facilitate control of the various aspects of the vehicle 100, including the velocity of the vehicle. For example, the vehicle control system 150 can be used to control throttle, braking, and other vehicle functions. The velocity management component 126 can be operable to send a command signal to the vehicle control system 150 to automatically adjust the velocity of the vehicle 100 based on the determination by the velocity management component 126 that the current velocity exceeds the determined threshold velocity of the train 100 on a particular path section, or an upcoming path section, and no other accident avoidance measures are to be employed, or previous accident avoidance measures, namely operator notifications, have not resulted in the reduction of the velocity of the vehicle 100. In such cases, the velocity management component 126 can initiate an automatic accident avoidance measure to positively control the vehicle 100 via the vehicle control system 150. In one example, an automatic accident avoidance measure can comprise controlling and operating the throttle of the vehicle 100 to reduce the velocity. In another example, an automatic accident avoidance measure can comprise controlling and operating the brakes of the vehicle 100.

The vehicle control system 150 itself can also include one or more systems to present information to an operator by way of a visual display device, an audio transmission device, a haptic feedback system, or any combination of these. In one example, the velocity management component 126 can be configured to notify the operator that the current velocity of the vehicle 100 exceeds the acceptable threshold velocity, and the velocity management component 126 can be configured to provide a predetermined duration of time in which the operator has to take action to initiate a reduction in velocity. If the predetermined amount of time lapses without the operator taking any action to reduce the velocity of the vehicle 100, the velocity management component 126 can then initiate an autonomous and automatic reduction in velocity by communicating a command to the vehicle control system 150, which command signal overrides and causes the vehicle control system 150 to reduce the velocity of the vehicle to or below the threshold velocity. As such, the velocity management component 126 can initiate redundant safety protocols to ensure safe operation of the vehicle 100 at a safe velocity.

The vehicle control system 150 can be an onboard system of the vehicle 100, and can comprise various mechanical devices and systems, as well as various electronic and computer systems operable with these, that can be used by an operator (and the trusted accident avoidance control system 120) to control various aspects of the vehicle 100 including, but not limited to, the velocity of the vehicle 100. For instance, the vehicle control system 150 can be used to control throttle, braking, and other vehicle functions.

It is contemplated that the trusted accident avoidance control system 120 can determine several estimated current positions simultaneously and on an ongoing or continuous basis using any combination of the example location determination systems and methods described herein. In one example, at least one of the location determination components used in the generation of an updated estimated current position solution will not be subject to error. For instance, an MU, operating as a first location determination component, can be operated simultaneously with one, two or n number of additional location determination components, each configured and operable to determine an estimated current position in connection with the one generated by the IMU. An example of an additional or second location determination can be one that determines an estimated current position based on tags embedded in the predetermined path. An example of a third location determination component can be one that determines an estimated current position using a tachometer. These three location determination components, and their associated systems and methods for operation, can be combined into the trusted accident avoidance control system 120 as a single system, and operated simultaneously and continuously to generate several different estimated current position solutions over a given duration of time, each of which can be communicated to the error correction component 124 and used to generate continuous and ongoing updated estimated current position solutions over the duration of time, which updated estimated current position solutions are continually communicated to the velocity management component 126 at any desired frequency or period of time. Furthermore, although some error may be present, the estimated current position solution based on embedded tags is not likely to be subject to any error that would lead to inaccuracies in location determination to any appreciable degree. Although the present disclosure discusses the various location determination components separately, it will be understood by those skilled in the art that several locations determination components can be operating at the same time within an trusted accident avoidance control system 120, and that different location determination systems and methods can be selectively activated and deactivated at desired or appropriate times so as to provide the most accurate and reliable velocity management of the vehicle 100 at any given time as it travels along the predetermined path.

The trusted accident avoidance control system 120 can comprise a specific type. In one example, the trusted accident avoidance control system can comprise a trusted train derailment avoidance control system for use with a train operating about a fixed track, namely a railroad track. In another example, the trusted accident avoidance control system 120 can comprise one for use with an automobile operating about a series of roads in accordance with a predetermined path for the automobile. In any case, the trusted accident avoidance control system 120 can function to reduce the risk of the vehicle inadvertently or accidentally leaving the predetermined path (e.g., a train derailing from a fixed railroad track), as is discussed herein.

Figure 2:
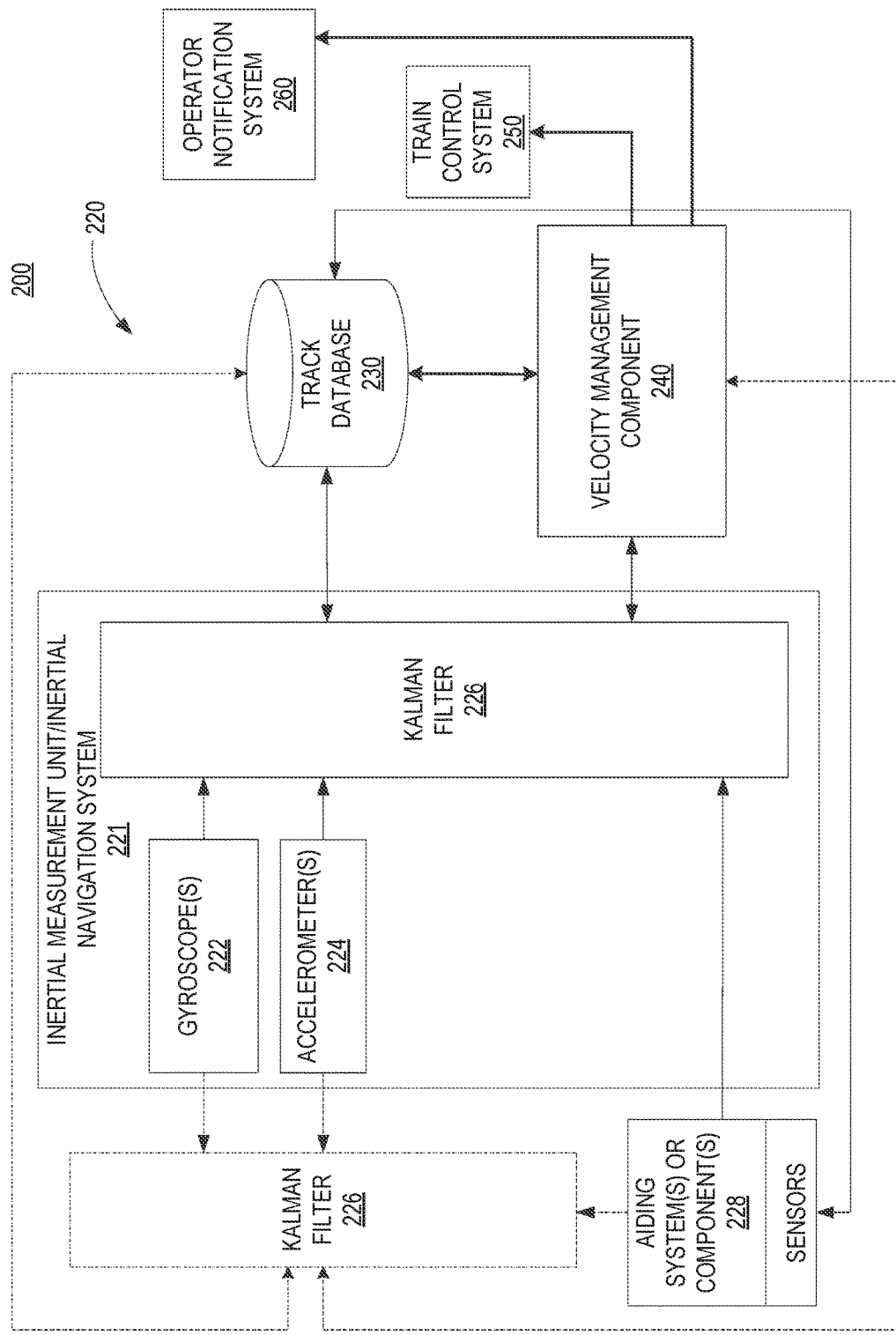
FIG. 2 illustrates a more specific example of the trusted accident avoidance control system of FIG. 1, wherein the trusted accident avoidance control system is specifically configured as a trusted train derailment avoidance control system operable with and supported on a train configured to operate on a predetermined path in the form of a fixed track.

Although the trusted accident avoidance control system can comprise different types associated with different types of vehicles and predetermined paths, FIG. 2 illustrates a specific type of trusted accident avoidance control system in the form of a trusted train derailment avoidance control system 220 intended and configured to be operable with and supported on a train 200 operating about a fixed track. Similar to the trusted accident avoidance control system discussed above and shown in FIG. 1, the trusted train derailment avoidance control system 220 can comprise two or more location determination components that can be used to estimate a current position of the train 200 on its fixed track, and which can be used to facilitate the determination of an acceptable threshold velocity for the current position of the train 200. As such, the discussion above regarding the trusted accident avoidance control system 120 is intended to be incorporated and applicable to the trusted train derailment avoidance control system 220 discussed below, and shown in FIG. 2, as will be apparent to those skilled in the art.

Again, the described position or location determination is considered to be "trusted" as the trusted train derailment avoidance control system 220 relies exclusively on on-board, train mounted or supported location determination components (e.g., a locomotive-mounted inertial measurement unit, and one or more aiding components or systems), as well as data corresponding to pre-surveyed features stored in one or more databases that are also part of the trusted train derailment avoidance control system 220, such that the trusted train derailment avoidance control system 220 can be considered a self-contained, closed system. Furthermore, all components and attributes of the system 220 are either under "control" of the managed railroad system (located in a secure or controlled region of the locomotive) or comprise rigid infrastructure/natural phenomena. The proposed method avoids the pitfalls of GPS or other radio-navigation based systems which can be readily compromised by signal denial due to natural radio-propagation phenomena (line-of-sight limitations, multipath, attenuation, etc.), jamming, deceptive signal re-transmission, as well as spoofing. However, it is contemplated that the trusted accident avoidance control systems discussed herein can further comprise a radio-navigation based system (e.g., a GPS system) that is used for secondary, non-essential verification or updating purposes, such as to verify the estimated current position solutions generated by the location determination components, or to validate an initial starting position (e.g., operator inputting the station in which the train is departing from) input by an operator, or to update or validate a navigation solution generated by an inertial sensor, or other similar purposes. It is not the intent to have the trusted accident avoidance control systems rely in any way on such radio-navigation based systems, or to have these be a required part of the navigation solutions discussed herein that are generated by the location determination components, or to give the results from these any significant weight in such navigation solutions.

In the specific example shown in FIG. 2, one of the location determination components can comprise an inertial-based location determination system (i.e., a dead reckoning inertial type of integrating sensor) supported on the train 200 and capable of generating a location or position of the train 200 based on inertial-based measurements, or derivations thereof (i.e., integrated measurement products). For example, the trusted train derailment avoidance control system 220 can comprise an inertial measurement unit (IMU) 221 as part of an inertial navigation system (INS) functioning as a first or primary location determination component. The inertial measurement unit 221 can be supported on the train 200 (i.e., on-board the train, such as the locomotive. As shown, the inertial measurement unit 221 can comprise one or more gyroscopes 222 and one or more accelerometers 224, as well as a processor and memory. In an alternative example, the inertial measurement unit 221 can be in communication with a computer having a processor and memory sufficient to operate the inertial measurement unit 221. Specific types of inertial measurement units contemplated for use include, but are not limited to MEMS-based inertial measurement units, and others, as will be apparent to those skilled in the art. IMU's can utilize different sensor technologies (e.g., accelerometer and gyroscope technologies). MEMS, fiber-optic, and Ring-Laser-Gyroscopes are examples of different gyroscope sensors. Accelerometers can be in the form of MEMS or pendulum. While all types could be used, MEMS-based sensors will meet drift accuracy requirements and have a significant cost advantage.

The trusted train derailment avoidance control system 220 can further comprise one or more aiding systems or components 228 operable to assist or to aid the inertial measurement unit 221 by providing aiding information, such as supplemental location or position data pertaining to the train 200 or supplemental velocity data. The aiding systems operate to aid the inertial measurement unit 221 by limiting IMU position error growth, or in other words, facilitating the correction of errors or drift in the inertial measurement unit 221, by providing an estimated current positions of the train 200 that can be used by an error correction component to update any estimated current position of the train 200 provided by the inertial measurement unit 221. Indeed, in one example, the aiding system or component 228 can comprise one or more location determination components operable to also estimate a current position of the train 200 (i.e., provide estimated current positon data, which is a form of aiding information) to be compared against the estimated current position of the train 200 generated by the inertial measurement unit 221 and the inertial navigation system. The trusted train derailment avoidance control system 220 can generate other types of aiding information besides location information. For example, aiding information can comprise zero-velocity condition information obtained by an inertial sensor (e.g., an accelerometer that may or may not be part of the IMU 221), such as when the train 200 is at rest, or velocity information from a wheel mounted tachometer.

The trusted train derailment avoidance control system 220 can further comprise an error correction component. In some examples, the error correction component can be implemented as an embedded device with a dedicated processor. In other examples, the error correction component can comprise a software module that runs on a shared computer having one or more processors and memories. In the specific example shown, the error correction component can comprise a Kalman filter 226 having a dedicated processor, wherein the Kalman filter 226 is operable to correct drift in the inertial measurement unit 221 based on receiving the estimated current positions from the inertial measurement unit 221 and the inertial navigation system, as well as any aiding systems or components 228 operable to also estimate a current location of the train 200. The inertial measurement unit 221 and the Kalman filter 226 can function together as the inertial navigation system. In one aspect, the inertial measurement unit 221 can house and support the error correction component or Kalman filter 226, or in other words, the inertial measurement unit 221 can comprise a Kalman filter. In another aspect, the error correction component, or Kalman filter 226, can be separate from, but in communication with, the inertial measurement unit 221 (see Kalman filter 226 alternatively shown in dotted lines). Those skilled in the art will recognize that a Kalman filter is not intended to be limiting in any way, and that this comprises one type of error correction/reduction component. Indeed, other types can be used, as will be apparent to those skilled in the art. A Kalman Filter is an estimator that incorporates inputs in an optimal manner (per the kinematic system model), and thus reduces error. It also smooths out statistical errors from the sequence of incoming measurements (i.e. the aiding information or data)

The trusted train derailment avoidance control system 220 can further comprise a velocity management component 240, and a path database. In the specific example shown, as the trusted train derailment avoidance control system 220 is operable with or on a train, the path database can comprise or can be referred to as a track database 230. The track database 230 can be in communication with the error correction component, such as the Kalman filter 226. Each of these is discussed in more detail herein.

As indicated, the inertial measurement unit 221, as one example of a dead reckoning inertial type of integrating sensor, can comprise and use one or more gyroscopes 222 and one or more accelerometers 224 to estimate a direction of movement and an acceleration associated with that movement (e.g., to derive a velocity estimate). With the Kalman filter 226 in receipt of the data from the inertial measurement unit 221, the location of the train 200 on the fixed track can be determined or derived. Thus, the inertial measurement unit 221, with the Kalman filter 226, can estimate a current location of the train 200 based on a known starting position and measurements of the direction and velocity of the train 200 over time. However, because the gyroscopes 222 and the accelerometers 224 have at least a small amount of noise or imprecision in their measurements, the location estimates generated by the inertial measurement unit 221 alone can have a small amount of error or drift. Over time this error can grow quite large as each new estimate is based on a previous estimate that included some amount of drift. As such, correcting the drift of the inertial measurement unit 221 can facilitate a more reliable and trustworthy navigation solution.

To reduce the amount of drift in the inertial navigation system and improve location estimates generally, the inertial measurement unit 221, in communication with the Kalman filter 226 as the error correction component, can provide estimated current position data from the accelerometers 224 and the gyroscopes 222 to the Kalman filter 226. The Kalman filter 226 can further receive aiding information from one or more aiding components in conjunction with the data from the accelerometers 224 and the gyroscopes 222. In one example, aiding information can comprise supplemental position data in the form of data corresponding to an estimated current position of the train 200 as generated from one or more aiding components 228 in the form of, or that comprise, a location determination component operable to provide such data to the Kalman filter 226. In another example, aiding information can comprise zero-velocity condition data, acceleration data, heading change data, data corresponding to the properties or characteristics of the fixed track, and others. As such, data from the inertial measurement unit 221, and aiding information, such as from one or more aiding components 228, can be received by the Kalman filter 226 for the purpose of correcting/reducing any drift within the inertial measurement unit 221, and for generating a more accurate updated estimated current location of the train 200 that can be used to determine whether a current velocity of the train 200 is safe and sufficient to prevent the train 200 from derailing from the track at its current location. In some examples, the Kalman filter 226 can transmit the updated estimated current position to the IMU 221, wherein the IMU 221 receives the updated estimated current position and uses the updated estimated current position to accurately identify a current section of the fixed track.

A variety of components can serve as aiding systems or components operable to generate aiding information, and particularly supplemental position data. These can include, but are not limited to, one or more location determination components, such as a tachometer, a path correlation component in the form of a track correlation component, a tag identification component, a path feature detection component in the form of a track feature detection component, a landmark identification component, and others, or any combination of these. Some discussion of various types of location determination components are described above with respect to FIG. 1, with these also being contemplated for use as part of the trusted train derailment avoidance control system 220, where it is intended that they can be implemented or incorporated, and where they can function, in a similar manner, but within and/or as applied to the trusted train derailment avoidance control system 220 and a fixed track. Therefore, the above discussion is incorporated here, as applicable, and as will be apparent to those skilled in the art.

While specific types of aiding components can function and comprise a type of location determination component operable to generate and provide aiding information in the form of supplemental position data, in another example, aiding information can comprise information associated with a zero-velocity vehicle condition of the train 200 (i.e., a condition in which the train 200 is at rest or is not moving). The trusted train derailment avoidance control system 220 can generate and obtain this information using an inertial sensor, such as the inertial measurement unit 221 on the train 200, or another or separate inertial sensor also on the train 200. For example, the inertial measurement unit 221 can be used to detect a zero-velocity condition (i.e., no detection of any change in acceleration or angular acceleration or velocity of the train 200), and then, once this condition is detected, the position of the train 200 can be estimated and the inertial measurement unit 221 updated to reduce any drift that may exist in the inertial measurement unit 221 and the inertial navigation system, as well as to determine an accurate estimated current positon (i.e., a calibration of the inertial measurement unit 221). The zero-velocity aiding information can be obtained whenever the train 200 is at rest, such as at an initial starting point (in a station). The trusted train derailment avoidance control system 220 can further utilize a tachometer on the train 200 that is not measuring any wheel revolutions to detect and confirm a zero-velocity condition, and then to communicate this information to the inertial measurement unit 221 and inertial navigation system. The tachometer can be used to confirm that any acceleration and velocity measurements from the inertial measurement unit 221 can be ignored and the estimated current position generated by the inertial measurement unit 221 and the inertial navigation system counted as accurate. In another example, the operator of the train 200 can input a signal indicating a zero-velocity condition, which information can be communicated to the inertial measurement unit 221. Upon receiving the zero-velocity aiding information, the inertial measurement unit 221 can operate to ignore any data received from the gyroscopes 222 or accelerometers 224 and to keep the estimated current position for the train 200 from changing until the train 200 begins to move, thus updating the inertial measurement unit 221 and the inertial navigation system.

In one example, the aiding component 228 can comprise a location determination component in the form of a tachometer, as discussed herein. In another example, the aiding component 228 can comprise a location determination component in the form of a track correlation component, this being a specific type of path correlation component, as discussed herein. In another example, the aiding component 228 can comprise a location determination component in the form of a tag identification component, as discussed herein. In another example, the aiding component 228 can comprise a location determination component in the form of a track feature detection component, this being a specific type of path feature detection component, as discussed herein. In another example, the aiding component 228 can comprise a location determination component in the form of a landmark identification component, as discussed herein.

In some examples, the Kalman filter 226 can be configured so as to enable the inertial measurement unit 221 and the inertial navigation system to receive multiple sequential measurements from a plurality of sources (e.g., the IMU 221 in addition to one or more aiding components 228) to estimate a current position and to facilitate generation of an updated estimated current position by the Kalman filter 226 even if the data sources have noise included in them.

Similarly as discussed above, once the Kalman filter 226, as the error correction component, generates an updated estimated current position, it can then, using the track database 230, identify and retrieve the threshold velocity from the track database 230 for the updated estimated current position. The velocity management component 240 can receive the threshold velocity information from the Kalman filter 226, and the velocity management component 240 can then compare the current velocity of the train 200, as communicated to the velocity management component 240 (e.g., by way of a speedometer supported on the train 200, or as derived from a tachometer or inertial sensor, or any combination of these), to the threshold velocity to determine if the current velocity of the train 200 exceeds the threshold velocity, which determination can be based on the updated estimated current position determined by the Kalman filter 226 (or another suitable type of error correction component). If the current velocity exceeds the threshold velocity, the velocity management component 240 can initiate one or more train derailment avoidance measures, such as to effectuate positive control of the train 200 by initiating a derailment avoidance measure (e.g., transmitting a command signal to the train control system 250 or the operator notification system 260 or both to facilitate a reduction in the current velocity of the train 200), as described herein.

More specifically, the trusted train derailment avoidance control system 220 can further comprise (and can access) a pre-existing or predetermined threshold velocity database comprising stored threshold velocity information associated with stored position and track information corresponding to various given and identified sections of track as part of a fixed track. The threshold velocity database can comprise and store this same information for a plurality of fixed tracks in various geographical locations. In the example discussed above, the threshold velocity database can be associated with or part of the track database 230, such that correlation of an estimated current position of the train 200 to information corresponding to sections of track on a fixed track stored in the track database 230 further comprises the retrieving of threshold velocity information associated with the stored information corresponding to the various sections of track. In another example, the threshold velocity database can be a standalone database accessible by the Kalman filter 226 as will be apparent to those skilled in the art.

Figure 3A:
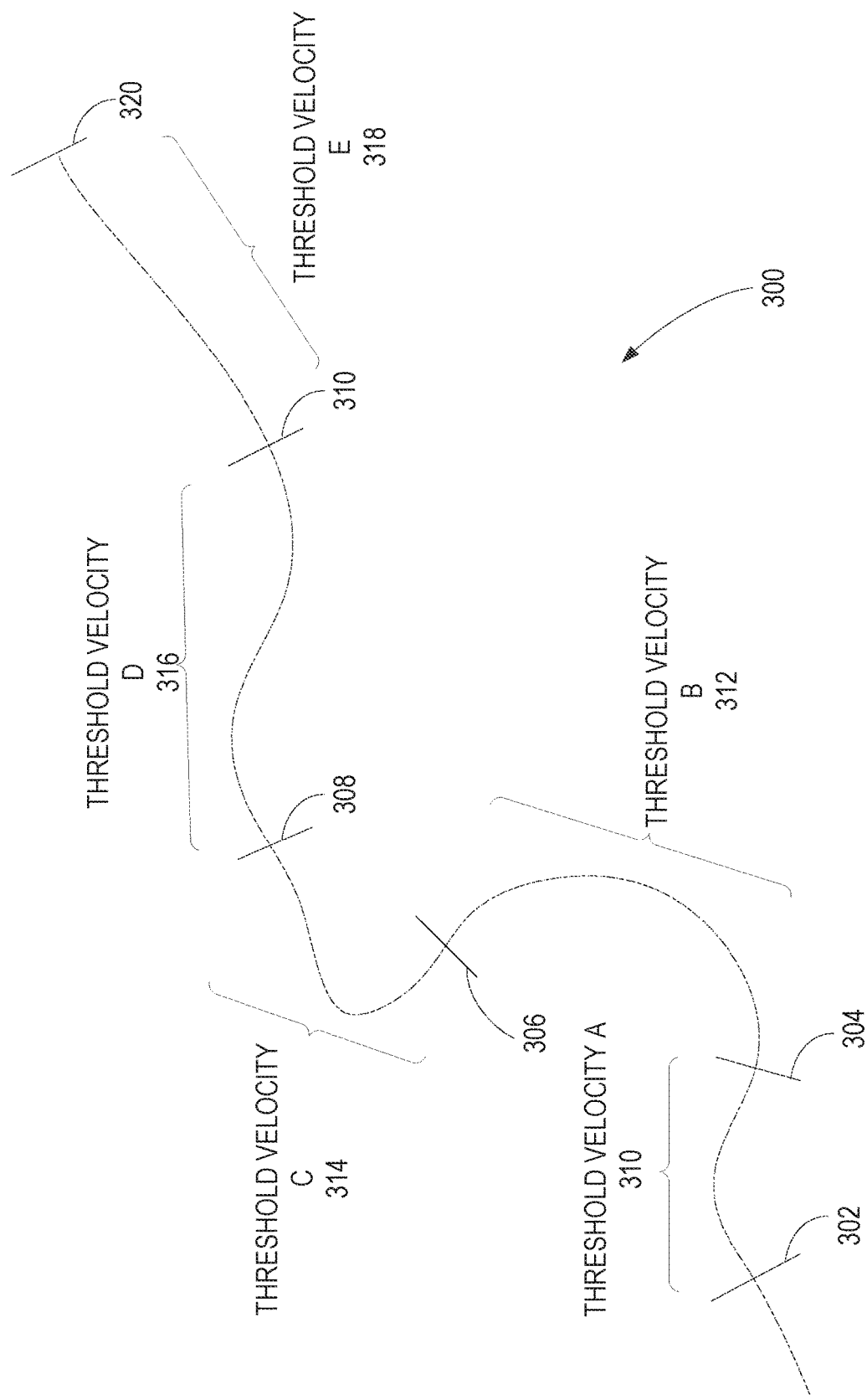
FIG. 3A illustrates a graphical representation of a portion of an example predetermined path in the form of a fixed track that has been pre-surveyed and divided up into a plurality of track sections with known information associated with the track sections that can be utilized by the train derailment avoidance control system of FIG. 2, in accordance with an example of the present disclosure.

With reference to FIGS. 2, 3A and 3B, illustrated is an example predetermined path in the form of a fixed track 300 having one or more types of information associated with the fixed track 300 that is compiled and stored in a threshold velocity database 350. FIG. 3A illustrates the example fixed track 300, which has been pre-surveyed and divided up into a plurality of track sections, wherein various types of information or data about the fixed track 300 and/or its track sections can be known and stored in a computer database accessible for use by a trusted accident avoidance control system in the form of the trusted train derailment avoidance control system 220, as discussed herein. In this example, the fixed track 300 is shown as being divided up into five track sections, each of which is delimited by a series of markers or dividers (e.g., see markers or dividers 302, 304, 306, 308, 310, and 320 delineating track sections 310, 312, 314, 316 and 318). The location, spacing, number of the dividers 302, 304, 306, 308, 310, and 320 delineating the track sections 310, 312, 314, 316 and 318 can be based on different pre-surveyed aspects of the fixed track 300. In one example, the dividers 302, 304, 306, 308, 310, and 320 can be located based on physical structures or objects associated with the fixed track 300 (e.g., turns, number of joints, location of signs, landmarks, hazards, and others), or they can represent certain coordinates along the fixed track 300, or they can be based on other identifiers as will be apparent to those skilled in the art. In one example, the track sections 310, 312, 314, 316 and 318 can be divided, such that each section has a single associated threshold velocity. In another example, the track sections 310, 312, 314, 316 and 318 can be divided, such that each track section has one or more associated threshold velocities, for example, depending upon the type of vehicle traveling about the track section. The track sections 310, 312, 314, 316 and 318 can still further be divided up in other ways as will be apparent to those skilled in the art.

As shown in FIG. 3A, the track section 310 from divider 302 to divider 304 has a threshold velocity A, the track section 312 from divider 304 to divider 306 has a threshold velocity B, the track section 314 from divider 306 to divider 308 has threshold velocity C, the track section 316 from divider 308 to divider 310 has threshold velocity D, and the track section 318 from divider 310 to divider 320 has threshold velocity E. Indeed, each of the respective threshold velocities associated with each of the respective track sections operate to define a safe speed at which the train 200 can travel about each particular track section. This track section data (the track section identification data and associated threshold velocity data) can be stored in the threshold velocity database. Thus, when the error correction component (e.g., see error correction component of FIG. 1 and/or Kalman filter 226 of FIG. 2) estimates a current location of the train 200 traveling on the fixed track 300, that location, and corresponding section of track, can be associated with one of the threshold velocities in the threshold velocity database 350. In this way, the error correction component can execute a correlation function to determine the threshold velocity for any particular location on the track 300.

As indicated, FIG. 3B illustrates an example computer threshold velocity database 350 containing the information or data associated with the track 300 and track sections from FIG. 3A. The threshold velocity database 350 can be accessed and used by the error correction component of a trusted accident avoidance control system (e.g., the error correction component 126 of the trusted accident avoidance control system 120 of FIG. 1 or the Kalman filter 226 of the trusted train derailment avoidance control system 220 of FIG. 2) to correlate the updated estimated current position of the train with the predetermined (pre-surveyed) track section data in the threshold velocity database. In keeping with the trusted train derailment avoidance control system 220, more specifically, the threshold velocity database 350 can comprise or be included in a track database, such as the track database 230 depicted in FIG. 2, that can be part of and accessed by components of the trusted train derailment avoidance control system 220, such as the error correction component, in this case the Kalman filter 226, to achieve correlation of a current position of the train 200 and the current section of track on which the train is traveling that that current position corresponds to (based on the updated estimated current positon of the train as determined by the location determination components, such as the inertial measurement unit 221 and one or more aiding components or systems 228) to specific information of the track 300 stored in the track database 350 corresponding to sections of the track 300, including identification data corresponding to the specific section of track on which the train is currently traveling, as well as associated known threshold velocity data associated with that section of track. Indeed, the track database 230 or the threshold velocity database 350, or both, can include various types of information associated with the plurality of track sections (e.g., the track sections 310, 312, 314, 316 and 318 of FIG. 3A) of the fixed track 300, in addition to the threshold velocity information. In one example, the information can include, but is not limited to, the identifier information or data 362 for each track section, which can comprise any type of data operable to identify each specific track section (e.g., a name, identifying number/alphanumeric identifying number, and others); beginning point information or data 364 for each track section; end point information or data 366 for each track section; and the threshold velocity information or data 368 for each track section. This information can be stored and represented in a variety of ways. In one example, the beginning point information 364 and the end point information 366 can be represented as points on the fixed track 300 at the dividers 302, 304, 306, 308 and 310, respectively, as shown in FIG. 3A. In another example, the beginning and end point information 364 and 366 can be represented as a specific distance along the fixed track 300 from a predetermined starting point. In still another example, the beginning and end point information 364 and 366 can be represented based on a coordinate system, such as altitude, latitude and longitude.

In accordance with a trusted, updated estimated current position or location solution derived by the error correction component (e.g., Kalman filter 226) as operable with the location determination component(s) (e.g., inertial measurement unit 221 and the inertial navigational system) and/or one or more aiding components 228 of the trusted train derailment avoidance control system 220, which locates the train 200 on a given track section of the fixed track 300 (e.g., track section 310), the velocity management component 240 can receive the derived and trusted updated estimated current position solution from the error correction component, as well as the stored track section data (the correlated stored track section identification data associated with the updated estimated current position and the associated threshold velocity information pertaining to that location and track section, as obtained from the track database 230/threshold velocity database 350, and as correlated by the error correction component). Further correlation can be carried out by the velocity managing component 240, namely correlation between a derived or known actual current velocity of the train 200 and the determined and retrieved threshold velocity from the threshold velocity database 350 for the current track section on which the train 200 is located. Current velocity data of the train can be communicated to or retrieved by the velocity management component 240. This correlation can be carried out to determine if the train 200 is traveling at an acceptable speed for the given section of track upon which it is currently traveling. Indeed, when the error correction component (e.g., error component 124 in FIG. 1, or the more specific Kalman filter 226 of FIG. 2) generates an updated estimated current position of the train 200 with a derived or known current velocity of the train 200, the error correction component can access the track database 230 to identify the specific track section on which the train 200 is currently traveling, and to obtain a threshold velocity from the threshold velocity database 350 for that specific track section, or an upcoming track section. For example, if the updated estimated current position of the train 200 provided by the Kalman filter 226 indicates that the current location of the train 200 is between dividers 304 and 306, as shown in FIG. 3A, the Kalman filter 226 can further access the track database 230 to correlate this data with the data stored in the track database 230 and to determine that the train 200 is traveling on track section 2 having associated therewith a threshold velocity of 35 MPH. Similar determinations can be made in a similar manner for the other track sections of the fixed track 300. Indeed, in practice, with the train 200 traveling in real-time, the trusted train derailment avoidance control system 220 can continuously or periodically provide a trusted, updated current location solution that can be correlated with the information about the track 300 in the track database 230. Moreover, the derived updated estimated current position solutions can be transformed/translated into a reference frame (e.g., WGS-84 Lat-Long-Alt or similar reference frame) consistent with the pre-existing threshold velocity database 350 that defines acceptable (e.g., threshold or maximum) speed limits for each specific track segment of the fixed track 300. At any given time, the derived updated estimated current position solution, as transformed/translated into the reference frame, can be cross-referenced with the threshold velocity data (as defined in the threshold velocity database). Subsequent comparison by the velocity management component 240 of the current actual train velocity (derived from one or more sensors as part of the train or the trusted train derailment avoidance control system or obtained from a speedometer) with the position-based determined acceptable threshold velocity from the threshold velocity database 350 can be used to rapidly identify an over-speed condition, where, if necessary, appropriate positive train control action can be carried out by the trusted train derailment avoidance control system 220, which can comprise one or more accident avoidance measures that can be initiated by the velocity management component 240 to bring the train to an acceptable speed, such as to facilitate a reduction in the current actual speed of the train 200, provide a warning notification to the operator of the train 200, and others as discussed herein.

It is noted that, in one example, the threshold velocity database 350 (and the track database 230), can be part of the computers of the trusted train derailment avoidance control system 220, which can all be supported on-board the train 200. In another example, the threshold velocity database 350 can be hosted and stored on a separate computer on-board the train, which can be still part of the trusted train derailment avoidance control system 220, and accessible by the error correction component. In each of these examples, the track database 230 and the threshold velocity database 350 (which may be combined together) can be hosted, stored and under control of the managed overall railroad system (which system includes the trusted train derailment avoidance control system) in order to secure these, thus contributing to the "trusted" positive train control functionality provided by the trusted train derailment avoidance control system 220.

Figure 4A:
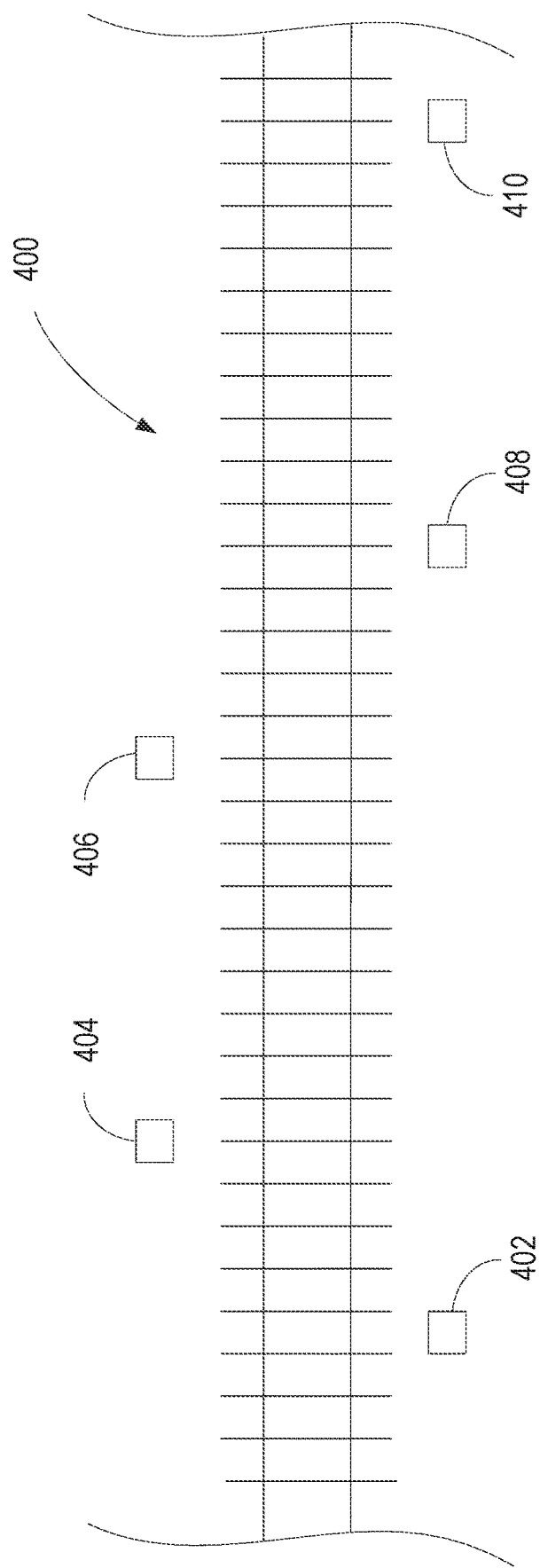
FIG. 4A illustrates a graphical representation of a portion of an example predetermined path in the form of a fixed track along with a series of pre-surveyed landmarks along the fixed track that can be associated with corresponding data that can be stored and utilized by the train derailment avoidance control system of FIG. 2, in accordance with an example of the present disclosure.

Referring back to FIG. 2, the trusted train derailment avoidance control system 220 can further comprise an aiding system 228 in the form of a landmark determination component operable with (i.e., can access) a landmark database comprising stored pre-existing or predetermined landmark data or information pertaining or corresponding to various landmarks associated with a fixed track. With reference to FIGS. 2, 4A and 4B, illustrated is a fixed track 400 having various landmarks (e.g. landmarks 402, 404, 406, 408 and 410) present along the fixed track 400. Specifically, the example fixed track 400 can run or extend along one or more areas in which distinguishable landmarks are present. These landmarks can be surveyed, specifically pre-surveyed, and various information pertaining to or associated with the landmarks, the track 400, or both, can be generated or determined. The information pertaining to or associated with the series of landmarks present along the fixed track 400, based on the survey, can be entered into a landmark database 450 (e.g., which can be a stand-alone database, or part of the path database 130 of FIG. 1). The landmark database 450 (or the track database 230 in the event this also comprises the landmark database) can include information, such as distinguishing features of each landmark, the type of each landmark, the location of each landmark (based on pre-surveyed data), the size of each landmark, the relationship of the landmark relative to the track 400, or any other information associated with each of the landmarks that can help distinguish each landmark from any other landmark. In the example shown, the fixed track 400 comprises a train track, and along the train track are five landmarks, namely landmarks 402, 404, 406 408 and 410, the number of which, and the location of which relative to the fixed track 400 and to each other are not intended to be limiting in any way. In some examples, one or more of the landmarks 402, 404, 406, 408 and/or 410 can comprise signs or other railway markers currently in existence; or they can comprise signs or other objects specifically placed to help the train 200 identify its current position (e.g., mile markers that denote the distance along the track). In still other examples, one or more of the landmarks 402, 404, 406 408 and/or 410 can comprise buildings or other physical structures that have been pre-surveyed. In still other examples, one or more of the landmarks 402, 404, 406, 408, and/or 410 can comprise trees, rock formations, or any other existing object that can be visually identifiable and distinguishable. Those skilled in the art will recognize other types of landmarks that can be utilized, and whose associated information can be included in the landmark database 450.

Although the landmark database 450 can comprise several different types of information associated with each of the landmarks 402, 404, 406, 408 and 410, such as data to assist in identifying and distinguishing each landmark, the landmark database 450 can, at a minimum, comprise location data identifying a precise location of each of the respective landmarks 402, 404, 406, 408 and 410, as well as at least one type of information associated with each of the landmarks 402, 404, 406, 408 and 410 that facilitates each of the respective landmarks to be analyzed for a potential match to captured visual or other data. The landmark database 450 can comprise any type of information about any type or number of landmarks associated with the fixed track 400. Once the landmarks 402, 404, 406, 408 and 410 have been surveyed and any associated information added to the landmark database 450 (including information that would allow the landmarks 402, 404, 406, 408 and 410 to be matched to captured visual data), the landmark database 450 can be hosted and stored on or as part of the computer system(s) of the trusted train derailment avoidance control system 220.

In practice, as a train (e.g., train 200) is traveling on the fixed track 400, the trusted train derailment avoidance control system 220, and particularly the landmark determination component operable with the landmark database 450, can be operated to initially capture current visual or image data (e.g., in real-time, periodically, at known or random intervals, etc.) pertaining to one or more sensed landmarks around the fixed track 400. The trusted train derailment avoidance control system 220 can access the landmark database 450 and the data associated with the landmarks 402, 404, 406, 408 and 410, and the currently captured visual data can be analyzed against the predetermined or pre-surveyed landmark data in the landmark database 450 to determine if a match exists. For example, if the system matches current captured visual data associated with the landmark 410 with the stored data in the landmark database 450 pertaining to or associated with the same landmark 402, then a match exists and the landmark determination component can generate and output supplemental position data in the form of an estimated current position of the train 200 (i.e., provide an estimated current position solution) on the fixed track 400 that can be considered reliable and trusted. This can be done for each of the remaining landmarks 404, 406, 408, and 410 as the train 200 progresses along the track 400. Obviously, the more pre-surveyed and identifiable landmarks there are, the more data points can be obtained and subsequently analyzed, thus leading to a higher probability of an accurate match and resulting generated estimated current location of the train. Indeed, the landmark database 450 can comprise information generated based on a plurality of landmarks around the fixed track 400. Analyzing and matching data from a plurality of landmarks (e.g., as the train 200 travels about the fixed track 400) can still further increase the probability of an accurate location solution on the fixed track 400.

Captured landmark information, including information from a previously conducted survey, about each of the landmarks that is to be stored in the landmark database 450 can include, but is not limited to, landmark identification data 462, associated visual identification data 464, and associated location data 466 (e.g., as shown in FIG. 4B). Landmark identification data 462 can comprise any type of information associated with each of the respective landmarks 402, 404, 406, 408 and 410, which can serve to identify each of the respective landmarks 402, 404, 406, 408 and 410, such as a name identifier, a number or alphanumeric identifier, or any other type of identifier. The landmark identification data 462 can be assigned to and associated with each landmark, such as in accordance with an established naming convention. Visual identification data 464 can comprise previously obtained visual data (e.g., still or video image data of the landmarks as obtained from a prior survey) that facilitates the landmark identification component to match current or real-time visual data captured by a camera supported on the train 200 as it travels about or on the fixed track 400 with the stored visual identification data 464 associated with the various landmarks encountered by the train 200, such as landmarks 402, 404, 406, 408 and 410 shown in FIG. 4A. Such stored visual identification data 464 can include, but is not limited to, edge data (e.g., data describing, pertaining to, or otherwise associated with the edges of a given object or landmark), color gradient data (e.g., data describing, pertaining to, or otherwise associated with the color of an object, including the color characteristics under a variety of lighting scenarios), location and positioning data, grey scale matching data, data to facilitate object recognition via one or more object recognition algorithms, or any other data that can be used to increase the chance of correctly identifying a given landmark as the stored visual identification data 464 is matched or compared to the current or real-time visual data. As in the example shown, each landmark 402, 404, 406, 408 and 410 identified by its respective landmark identification data 462, namely 1-5, can comprise associated visual identification data 464 (represented as Data 1-Data 5, respectively).

Moreover, each landmark 402, 404, 406, 408 and 410 can be associated with specific location data 466 that represents or indicates a precise location of each respective landmark 402, 404, 406, 408 and 410 along a specific track section of fixed track 400. The location data 466 can be represented as numbers, each of which that are associated with particular points corresponding to the landmarks 402, 404, 406, 408 and 410 shown in FIG. 4A. However, as with the database example in FIG. 3B, a variety of methods can be used to represent location. For example, the location data 466 of one or more of the landmarks 402, 404, 406, 408 and 410 might represent or be based on a certain distance along a predetermined path or track from a particular starting location. In another example, the location data 466 of one or more of the landmarks 402, 404, 406, 408 and 410 can be represented by or be based upon a coordinate system, such as latitude and longitude (and in some cases altitude). The location data 466 can comprise other location information, or can be based on still other aspects of the various landmarks 402, 404, 406, 408 and 410, as will be appreciated by those skilled in the art.

In one example, the landmark determination component can comprise a camera, a processor, and matching software (e.g., any matching software as will be recognized by those skilled in the art) that allows the landmark determination component to capture current visual data, and to use this data to determine one or more matches between the current visual data and the stored visual identification data 464 associated with one or more of the plurality of pre-surveyed landmarks 402, 404, 406, 408 and 410, as shown in FIG. 4A, and stored in the landmark database 450, the matching function being carried out for the purpose of determining a location of the train 200 on the fixed track 400 based on the matched location data 466. Indeed, the landmark identification component, in connection with the landmark database 450, can be operable to facilitate an estimated current position of the train 200. If a match can be determined, the landmark determination component can provide the estimated current position to the Kalman filter 226 to facilitate generation of an updated estimated current position of the train 200, in a similar manner as the other aiding systems as discussed herein, which updated estimated current position can then be used by the velocity management component 240 for the purpose of ensuring a safe current velocity or speed of the train based on its determined current location. When the landmark determination component (e.g., acting as one of the location determination components 122-1 or 122-2 in FIG. 1, or as a location determination component serving as an aiding component 228 in FIG. 2) identifies a particular landmark (e.g., one or more of landmarks 402, 404, 406, 408 and 410, as shown in FIG. 4A), it can use the location data 466 associated with that landmark to provide a trusted, reliable current position measurement to the Kalman filter 226 to correct any errors in location determination from other components and methods used for estimating the location of the train 200. For example, with the IMU 221 acting as the primary location determination component, the IMU 221 will likely experience a small amount of drift so as to render its estimated current position somewhat inaccurate (e.g., as this is provided continuously over time). The Kalman filter 226 can correct for that drift when a landmark with a known location is identified by the landmark determination component, and an estimated current position of the train 200, as determined by the landmark determination component, is provided to the Kalman filter 226 (as the error correction component) as a measurement, resulting in appropriate error correction. In this way, errors in estimating the actual current location of the train 200 can be reduced as the initial current position of the train 200 as estimated by the IU 221 can be periodically corrected by the estimated current position provided to the Kalman filter 226 by the landmark determination component operable with the landmark database 450, such that the Kalman filter 226 can generate an updated estimated current position of the train 200 that is more reliable, and which can be provided to the velocity management component 240, similar as discussed herein with other aiding components or systems 228.

In one example landmark database 450 (e.g., as part of an associated track database, such as track database 230), can be part of the computers and computer system of the trusted train derailment avoidance control system 220 that are on-board the train 200. In another example, the landmark database 450 can be hosted and stored on a separate computer on-board the train 200, but still accessible by the landmark determination component. In each of these examples, the landmark database 450 can be hosted, stored and under control of the managed overall railroad system (including the trusted train derailment avoidance control system 220) in order to secure the landmark database 450, thus contributing to the "trusted" positive train control functionality provided by the trusted train derailment avoidance control system 220.

Referring back to FIG. 2, the trusted train derailment avoidance control system 220 can further comprise an aiding system in the form of a correlation component, and specifically a track correlation component, operable track the position of the train 200 without the aid of external communication systems, and operable to provide an estimated current position of the train 200 based on a correlation of current measured or sensed headings and movements of the train 200 with unique and specific features of the fixed track, including unique spatial positions and/or patterns or heading changes and/or sequences (that the train 200 would be subjected to) resulting from individual turns and successive turns or turn patterns in the fixed track (as applicable based on the configuration of the fixed track), which features can be pre-surveyed and represented by corresponding data in a correlation database. Inherent in any fixed track on which a train or other vehicle operates are one or more turns, each of which can comprise one or more measurable distinctive characteristics or attributes or features/elements, such as an initial direction or heading of the turn (relative to a starting point or known direction of travel), heading changes through the turn, a final heading of the turn, a radius or curvature of the turn, and others as will be recognized by those skilled in the art. Other measurable characteristics or attributes of a fixed track can be obtained based on the interrelationship between two or more turns, or a plurality of turns, of the fixed track when the two or more turns are compared to one another. In this case, the individual characteristics or attributes of each turn can be measured, as well as their compared or interrelated or collective characteristics or attributes, such as the distance or spacing between two or more turns (which turns may or may not be successive or adjacent one another), their relationship to straight sections, or others as will be recognized by those skilled in the art. Still other measureable characteristics or attributes of the fixed track, based on the turns present in the fixed track, can be obtained from the operation and movements of a vehicle on the fixed track as the vehicle travels through the various turns. These can be a function of the velocity or speed of the vehicle through the various turns, such as a measure of centripetal acceleration or angular acceleration in different directions for each turn or a series of turns, linear acceleration, and others as will be recognized by those skilled in the art. Indeed, each of these measurable features can be pre-surveyed or predetermined and associated with corresponding data for storage in the correlation database (which can be part of a track database, such as track database 230, or it can be a standalone database).

Figure 5:
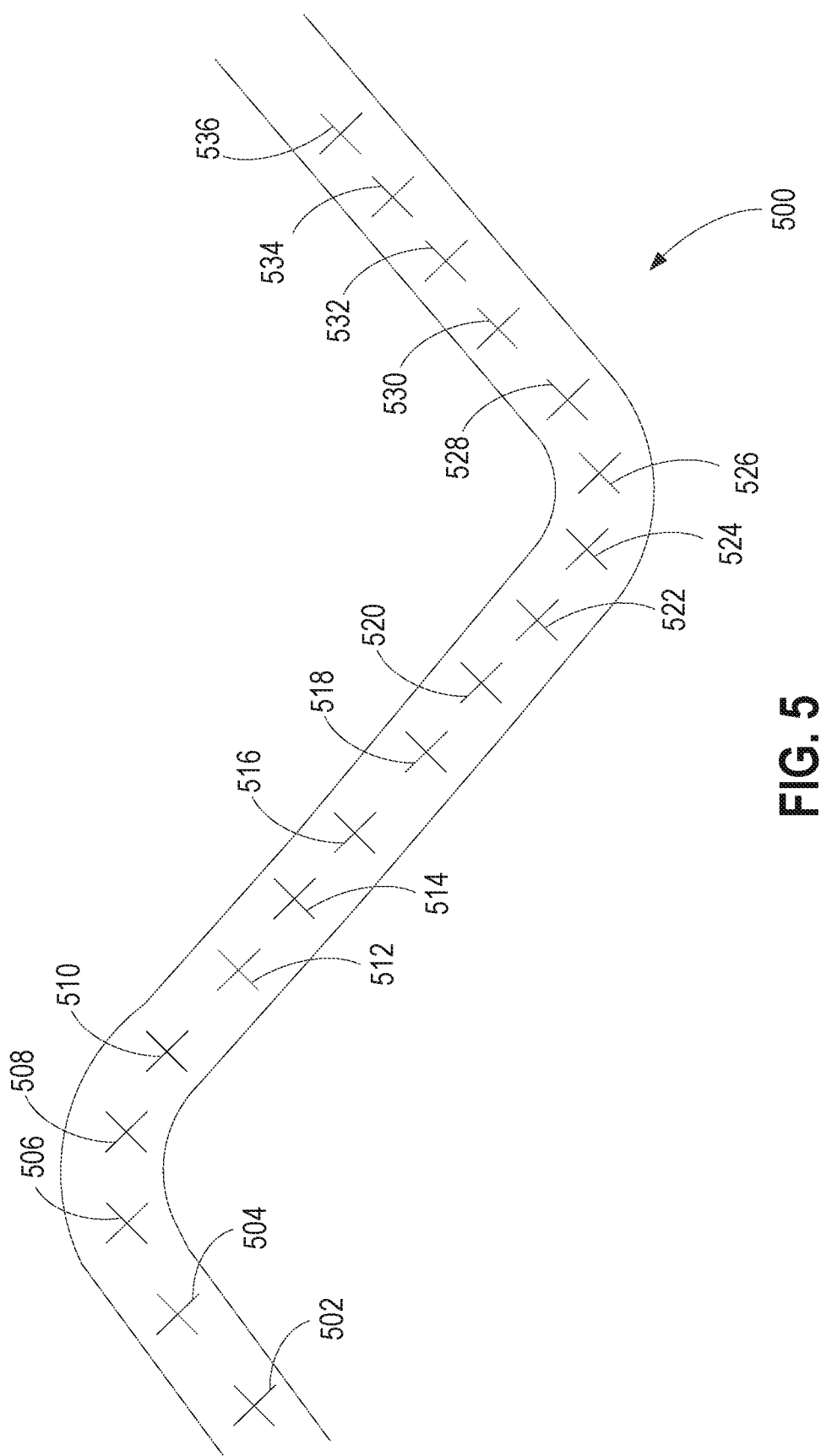
FIG. 5 illustrates a graphical representation of a portion of an example predetermined path comprising a plurality of pre-surveyed measurement points that can be associated with corresponding data pertaining to the measurement points, as well as velocity derived data pertaining to a vehicle traveling across the measurement points, which data can be obtained and utilized for correlation purposes by the trusted train derailment avoidance control system of FIG. 2, in accordance with an example of the present disclosure.

With reference to FIGS. 2 and 5, illustrated is an example predetermined path in the form of a fixed track 500 (e.g., a railroad track), on which a vehicle in the form of the train 200 travels. To achieve track correlation and to initially build the correlation database, the fixed track 500 can first be mapped, and the features or characteristics of the fixed track 500, including the various turns both individually and/or in a collective selected group, can be measured. Mapping can be carried out in a variety of ways, such as by operating a vehicle (e.g., a train or other vehicle capable of traveling on the fixed track) on the fixed track 500, wherein the vehicle is equipped with a measuring system, including sensors and other necessary components operable to take a series of measurements at given points separated at given distances along the fixed track 500 (e.g., see measurement points 502-536). In one example, the fixed track 500 can be measured to comprise a plurality of equal distant points identified for the purpose of determining angular accelerations as a function of velocity. The velocity of the vehicle can be obtained using a speedometer, or derived from a speed/velocity sensor, such as a tachometer or an inertial sensor. Turns in the fixed track 500 operate to generate angular accelerations within the vehicle traveling on the fixed track 500 dependent upon the velocity of the vehicle, which can be measured by an inertial sensor (e.g., one or more accelerometers, an IMU). This can lead to a derived radius for each of the turns. Other sensors on the vehicle can include a tachometer, speedometer, or other speed sensor, where $V^2$ at each of the measurement points 502-536 can be measured. The vehicle can further comprise one or more accelerometers operable to provide acceleration data (e.g., in three dimensions) at each of the measurement points 502-536. The data obtained at each of the measurement points 502-536 can be used to measure the total angular acceleration of the vehicle at each of the particular measurement points 502-536, and particularly those in the various turns. If the speed or velocity of the vehicle is changing, then linear acceleration measurements can also be obtained, wherein the centripetal acceleration can be determined by measuring the total acceleration and subtracting the linear acceleration. In one example, the accelerometers 224 from the inertial measurement unit 221 can be used to generate the acceleration measurements. In another example, accelerometers independent of the inertial measurement unit 221 can be used.

Using the track measurements of angular acceleration and speed, the track correlation component can further be configured (e.g., using a computer) to derive a parameter that describes the fixed track 500 independent of the speed or velocity of the vehicle. In an example, the derived velocity independent parameter can be the value $$\frac{1}{R},$$

where R is representative of the radius of a curve that the fixed track 500 is following at the moment of measurement. To make the track measurements independent of velocity, the values can be stored in a normalized way. This derived parameter can be determined by solving for R in the following equation:

$$|\text{Acceleration Inputs}| = |\text{Vehicle Acceleration}| + \frac{V^2}{R}$$

where V represents the velocity of the vehicle, and where $$\frac{V^2}{R}$$

represents the centripetal acceleration, with the value $$\frac{1}{R}$$

being the velocity independent value.

Assuming the vehicle is not accelerating (i.e., not speeding up or slowing down), this equation can be reduced to the following:

$$\text{Angular Acceleration} = \frac{V^2}{R}$$

Using this equation, and with a measured angular acceleration and speed or velocity, the track correlation component can determine the value of $$\frac{1}{R}$$

for each measurement point 502-536 on the fixed track 500. The $$\frac{1}{R}$$

measurements or values can be stored in the correlation database, as a series of values that represent $$\frac{1}{R}$$

at each measurement point along the fixed track 500.

During the pre-surveying of the fixed track 500 to obtain the $$\frac{1}{R}$$

values, the position or location of each of the measurement points 502-536 can be obtained and also stored in the correlation database. In one example, location information can comprise the longitude and latitude (and in some cases altitude) values that are associated with each of the measurement points 502-536 along the fixed track 500 where the measurements were taken. As such, each of the measurement points 502-536 comprises data stored in the correlation database that corresponds to the $$\frac{1}{R}$$

value, as well as the location of each of the measurement points 502-536.

The spacing or density of each measurement point along the fixed track 500 (and thus the number of points) can be varied. In addition, the density of measurement points within a turn may be greater than the density of measurement points along a straight section.

With respect to the train 200 operating on the fixed track 500, the train 500 can operate the track correlation component to estimate a current location of the train 500, which estimated current position can be provided to the Kalman filter 226 as supplemental position data to assist the IMU 221 in establishing an accurate updated current location of the train 200 on the fixed track 500. As the train 200 travels along the fixed track 500, the track correlation component can determine $$\frac{1}{R}$$

values in the same manner as discussed above, which values can be compared to the previously determined and stored $$\frac{1}{R}$$

values, which stored $$\frac{1}{R}$$

values are associated with location information, as discussed above. Indeed, the current determined $$\frac{1}{R}$$

values can be compared with the stored $$\frac{1}{R}$$

values in order to determine a match. The number and location of measurement points on any given fixed track and the $$\frac{1}{R}$$

values can be determined based on track distance (speed vs. time). Correlating the series of current $$\frac{1}{R}$$

values to those stored in the correlation database will allow the trusted train derailment avoidance control system 220 to determine an estimated current position of the train 200, which can be provided to the Kalman filter 226. Specifically, once measurements for the fixed track 500 (and any number of other fixed tracks) have been made and stored in the correlation database, the track correlation component on the train 200, as part of the trusted train derailment avoidance control system 220, can be operated to measure and determine a series of consecutive $$\frac{1}{R}$$

values on a current fixed track (e.g., fixed track 500) and to match these against a same consecutive number of store $$\frac{1}{R}$$

values from the plurality of stored $$\frac{1}{R}$$

values in the correlation database. In the event a match is found (i.e., a matching pattern is determined), a corresponding current location of the train 200 can be determined based on the location data or information associated with the stored $$\frac{1}{R}$$

values in the correlation database.

Using the fixed track 500 as a specific example, a match can be determined by determining current $$\frac{1}{R}$$

values at each of the measurement points 502-536 as the train 200 travels along the fixed track 500, and storing a fixed number of these as recent $$\frac{1}{R}$$

values. These recent $$\frac{1}{R}$$

values can represent the $$\frac{1}{R}$$

values for a window (e.g., a select number) of the measurement points 502-536 along the fixed track 500. The track correlation component can then compare the difference between the recent measured and stored $$\frac{1}{R}$$

values and a plurality of pre-measured and store $$\frac{1}{R}$$

values along different sections of the fixed track 500 in order to try to determine a match (e.g., a pattern of matching values), wherein if a match is identified, the track correlation component can determine where the train 200 was on the fixed track 500 at a known time in the past (as the determination is based on the stored recent $$\frac{1}{R}$$

values). This information could then be used as a position update as it has been determined with a high degree of certainty where the train 200 is on the fixed track 500.

Using a sliding or rolling number of recent stored $$\frac{1}{R}$$

values that are obtained as the train 200 travels along the fixed track 500, and comparing these to a plurality of predetermined stored $$\frac{1}{R}$$

values in the correlation database (i.e., correlating current measurements with stored measurements), the track correlation component can, using a computer, output a value that represents the collective comparison or correlation between these. Thus, if the comparison of the plurality of recent stored $$\frac{1}{R}$$

values to a plurality of those $$\frac{1}{R}$$

values predetermined and stored in the correlation database for a particular section of the fixed track 500 outputs a value above a certain threshold, the track correlation component can determine the $$\frac{1}{R}$$

values match, and also that the particular current section of the fixed track 500 on which the train 200 currently resides matches the location information of the section of track associated with the identified $$\frac{1}{R}$$

values. The track correlation component can then generate an estimated current position solution to be provided to the Kalman filter 226 as aiding information in the form of supplemental position information. Essentially, the track correlation component correlates the accelerations detected (measured by the IMU 221) against those anticipated from changes in the fixed track 500. These maneuver correlations can be used to update the navigation solution from the IMU 221 to account for drift and to avoid reliance on external communication (e.g., GPS or other external references) that could be jammed or spoofed.

Like other aiding systems of components, the determination of current stored $$\frac{1}{R}$$

values and the comparison of these to known stored $$\frac{1}{R}$$

values as carried out by the track correlation component can occur continuously as the train 200 is traveling on the fixed track 500 to provide continuous or periodic estimated current position updates to the Kalman filter 226 for the purposes discussed herein.

It is noted that as there may be some error between the current (and recently stored $$\frac{1}{R}$$

values and those stored in the correlation database, the window of measurement points and the number of compared values may be increased (i.e., the sample of compared $$\frac{1}{R}$$

values increased) in order to improve the accuracy in terms of the data compared, and to improve the confidence and reliability in any identified match of data. It is also noted that the window of measurement points can vary depending upon the number of measurement points needed to accurately determine a current location of the train 200. For example, if some knowledge of track location is known (e.g., the specific track is identified and input into the trusted train derailment avoidance control system 220 at an initial starting point), then the number of measurement points needed to determine an accurate current location of the train 200 using the track correlation component can be reduced. It is further noted that where the current $$\frac{1}{R}$$

values are zero or near zero for a given duration of time, thus representing a straight section of track, or a section of track on a slight curve, then correlations with the correlation database can be temporarily suspended.

It is noted that more than one aiding component 228 can be operable at the same time and in a continuous manner to generate and provide concurrent, real-time estimated current positions of the train 200 in connection with the estimated current position generated by the inertial measurement unit 221, wherein an updated estimated current position can be based on the concurrent estimated current positions from the various aiding components 228 in operation.

With reference again to FIG. 2, the trusted train derailment avoidance control system 220 can further comprise a jerk detection component. The jerk detection component can be configured to detect jerk-based differential inertial accelerations in the train 200 over a fixed period of time. Such inertial accelerations can comprise sudden or instantaneous, unexpected impact forces, such as those that would be imposed upon and propagated through the train 200 as a result of a traumatic triggering event, such as an accident (e.g., an impact or collision of the train 200 with an object) or derailment of the train 200. In one example, the jerk detection component can comprise an inertial based sensor, such as an inertial measurement unit (e.g., the inertial measurement unit 221 or a separate, standalone inertial measurement unit) in connection with a processor/computer capable of performing the processing functions described below, such as the Kalman filter 226 or another processor/computer (e.g., a shared computer/processor, one associated with the velocity management or another component disclosed herein). The jerk detection component can further be configured to analyze, using a computer, current jerk-based differential inertial acceleration measurements taken over time, and to compare these to a pre-defined differential inertial acceleration threshold value. In one example, the differential inertial acceleration measurements can be taken in a constant and continuous manner during operation of the train 200. In accordance with a determination that a current measured estimated "jerk" (i.e., a current estimated differential inertial acceleration) exceeds the pre-defined threshold limit, the jerk detection component can generate a shut-down signal, which shut-down signal can be configured to facilitate initiation of an appropriate derailment avoidance measure. The shut-down signal can be communicated to the velocity management component 240, wherein the velocity management component 240 can initiate one or more train derailment avoidance measures, such as to effectuate positive control of the train 200, namely to reduce the current velocity of the train 200, to stop the train 200, or both, based on an assumption that the train 200 has been involved in an accident, or a part of the train 200 has derailed from the fixed track.

Figure 6:
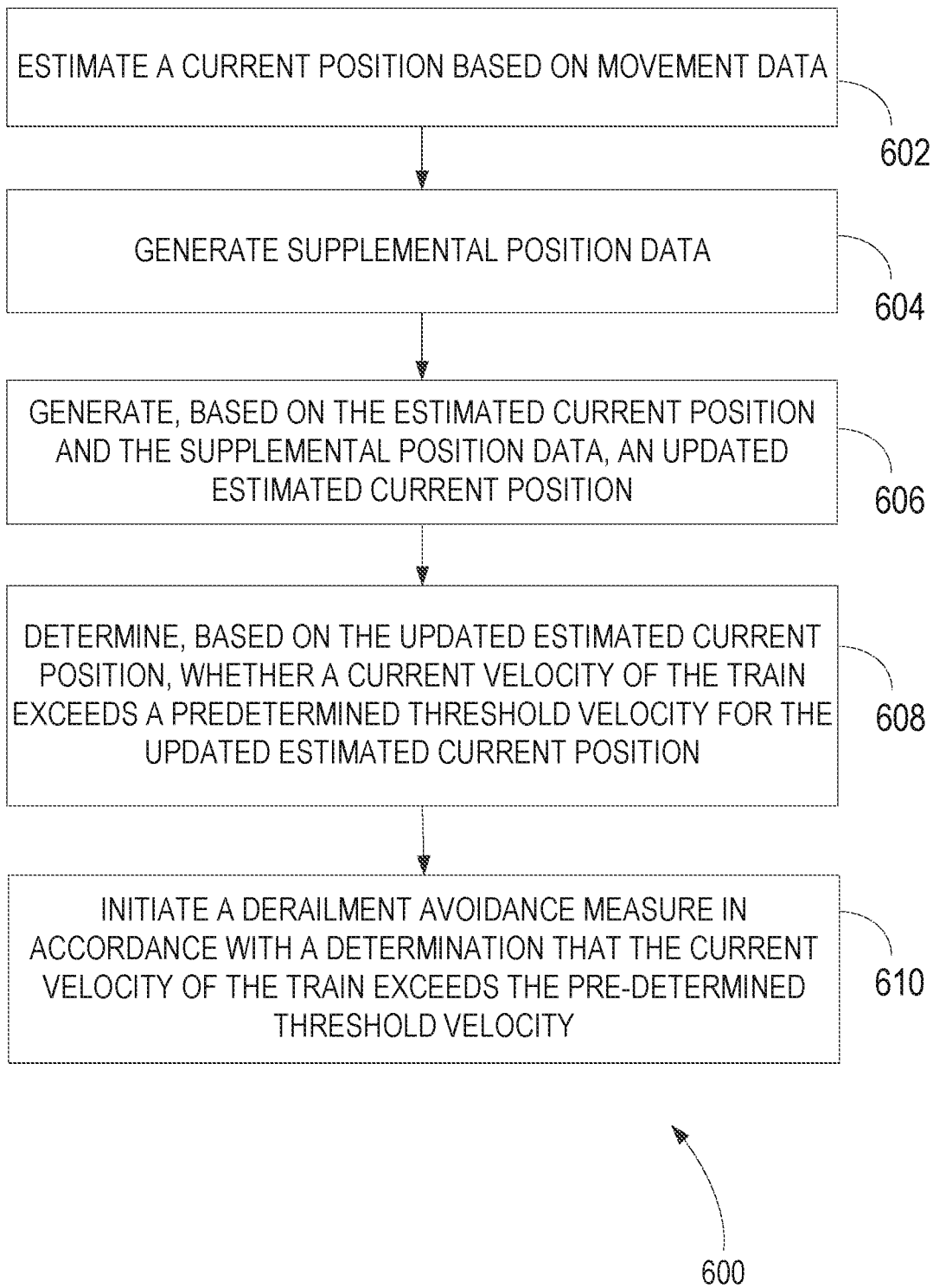
FIG. 6 is a flow diagram illustrating a method for, in a trusted manner, preventing derailment of a train in accordance with an example of the present disclosure.

FIG. 6 is a flow diagram illustrating a method for preventing train derailment in accordance with an example of the present disclosure. Each of the operations shown in FIG. 6 can correspond to instructions stored in a computer memory or computer-readable storage medium. The method described in FIG. 6 can be performed by a trusted accident avoidance control system in the form of a trusted train derailment avoidance control system (e.g., system 220 in FIG. 2). However, the method described can also be performed by any other suitable configuration of electronic hardware and software.

As part of the method, a location determination component in the form of an inertial measurement unit (IMU) supported on a train can be configured to estimate, and the method can further comprise estimating (602), a current position of the train based on an initial position and movement data measured by the IMU, and to output data corresponding to an estimated current position of the train. The trusted train derailment avoidance control system can further comprise an aiding component, also supported on the train. In one aspect, the aiding component can comprise a location determination component, and the method can further comprise estimating (604), using the aiding component, a current position of the train, which can be referred to as supplemental position data (a type of aiding information), that can be used to correct drift in the IMU by updating the navigation solution generated by the IMU. Both the IMU and the aiding component can obtain movement data and generate position data in a trusted manner to ensure the integrity and reliability of the generated estimated current position and the generated supplemental position data. Specifically, the IMU and the aiding component can be configured so as to not have to rely on external sources (e.g., global position satellite (GPS) or Global Navigation Satellite System (GNSS) signals) to determine their respective current position solutions. In this way, all sources of position information are self-contained, and the position solutions generated internally to the train, thus making the trusted train derailment avoidance control system resistant to compromise by outside entities. The aiding component can be one of a plurality of devices capable of estimating a current location of the train, as discussed above.

The method can further comprise, using an error correction component, generating (606) an updated estimated current position based on the estimated current position from the IMU and the supplemental position data from the aiding component(s). The error correction component can be incorporated into the IMU and the estimated current positions can be transmitted to the IMU from the aiding component.

The method can further comprise determining (608), based on the updated estimated current position of the train, whether a current velocity of the train exceeds a predetermined threshold velocity of the updated estimated current positon of the train. In some examples, a velocity management component determines, based on the updated estimated current position, whether a current velocity of the train exceeds a predetermined threshold velocity for the updated estimated current position. The velocity management component can be in communication with, and can access or otherwise obtain from a track database (which includes a threshold velocity database) the predetermined velocity threshold for the identified current section of the fixed track on which the train is currently traveling.

The method can further comprise initiating (610) a derailment avoidance measure in accordance with a determination that the current velocity of the train exceeds the predetermined threshold velocity. Initiation of a derailment avoidance measure can be a function of a velocity monitoring component. In one aspect, the operation of initiating a derailment avoidance measure can comprise the velocity management component sending a command signal to an operator notification system notifying an operator of the train that the current velocity of the train exceeds the predetermined threshold velocity. In another aspect, the operation of initiating a derailment avoidance measure can comprise the velocity management component sending a command signal to a train control system that automatically causes the train control system to reduce the velocity of the train.

Figure 7:
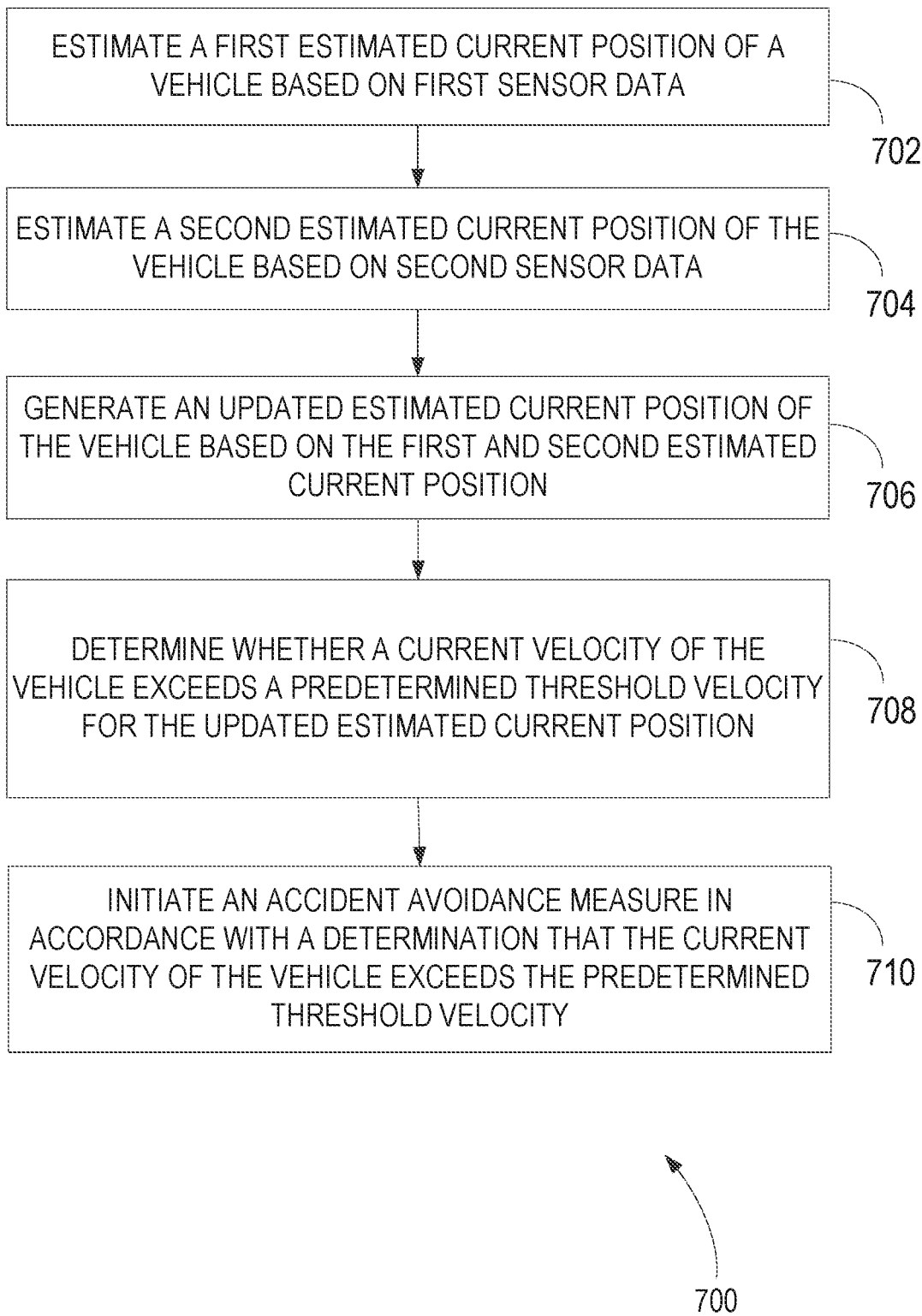
FIG. 7 is a flow diagram illustrating a method for, in a trusted manner, avoiding accidents while operating a vehicle in accordance with an example of the present disclosure.

FIG. 7 is a flow diagram illustrating a method for avoiding an accident (e.g., reducing the potential for derailment of a train operating about a fixed track, or an automobile from deviating from a predetermined path) while operating a vehicle, in accordance with an example of the present disclosure. Each of the operations shown in FIG. 7 can correspond to instructions stored in a computer memory or computer-readable storage medium. The method described in FIG. 7 can be performed by a trusted accident avoidance control system, generally (e.g., system 120 in FIG. 1). However, the method described can also be performed by any other suitable configuration of electronic hardware and software.

The trusted accident avoidance control system can comprise a first location determination component having a first sensor supported on the vehicle. As part of the method, the first location determination component can be configured to estimate, and the method can further comprise estimating (702), a first current position of the vehicle based on data from the first sensor. The trusted accident avoidance control system can comprise a second location determination component having a second sensor supported on the vehicle, which second location determination component can be configured to estimate, and the method can further comprise estimating (704) a second current positon of the vehicle based on data from the second sensor. Each of the first and second location determination components can be operated simultaneously with one another, and the positon solutions generated by each compared with one another. The first and second location determination components can comprise any of those discussed herein. In addition, both the first and second location determination components can generate position data in a trusted manner to ensure the integrity and reliability of the generated estimated current position and the generated supplemental position data, as discussed above.

In some examples, the trusted accident avoidance control system can include a third location determination component having a third sensor supported on the vehicle. Essentially, it is contemplated that the trusted accident avoidance control system can include any number of location determination components operating simultaneously with one another, or in a more selective manner where different location determination components are operated at different times, depending upon the needs of the situation.

The method can further comprise, using an error correction component, generating (706) an updated estimated current position of the vehicle based on the estimated current position from the first and second location determination components.

The method can further comprise determining (708), based on the updated estimated current position of the vehicle, whether a current velocity of the vehicle exceeds a predetermined threshold velocity of the updated estimated current positon of the vehicle. In some examples, a velocity management component determines, based on the updated estimated current position, whether a current velocity of the vehicle exceeds a predetermined threshold velocity for the updated estimated current position. The velocity management component can access a path database to identify the predetermined velocity threshold velocity for the identified current section of the predetermined path on which the vehicle is currently traveling.

The method can further comprise initiating (710) an accident avoidance measure in accordance with a determination that the current velocity of the vehicle exceeds the predetermined threshold velocity. Initiation of an accident avoidance measure can be a function of a velocity monitoring component. In one aspect, the operation of initiating an accident avoidance measure can comprise the velocity management component sending a command signal to an operator notification system notifying an operator of the vehicle that the current velocity exceeds the predetermined threshold velocity. In another aspect, the operation of initiating a derailment avoidance measure can comprise the velocity management component sending a command signal to a vehicle control system that automatically causes the vehicle control system to reduce the velocity of the vehicle.

Example Machine Architecture and
Machine-Readable Medium

Figure 8:
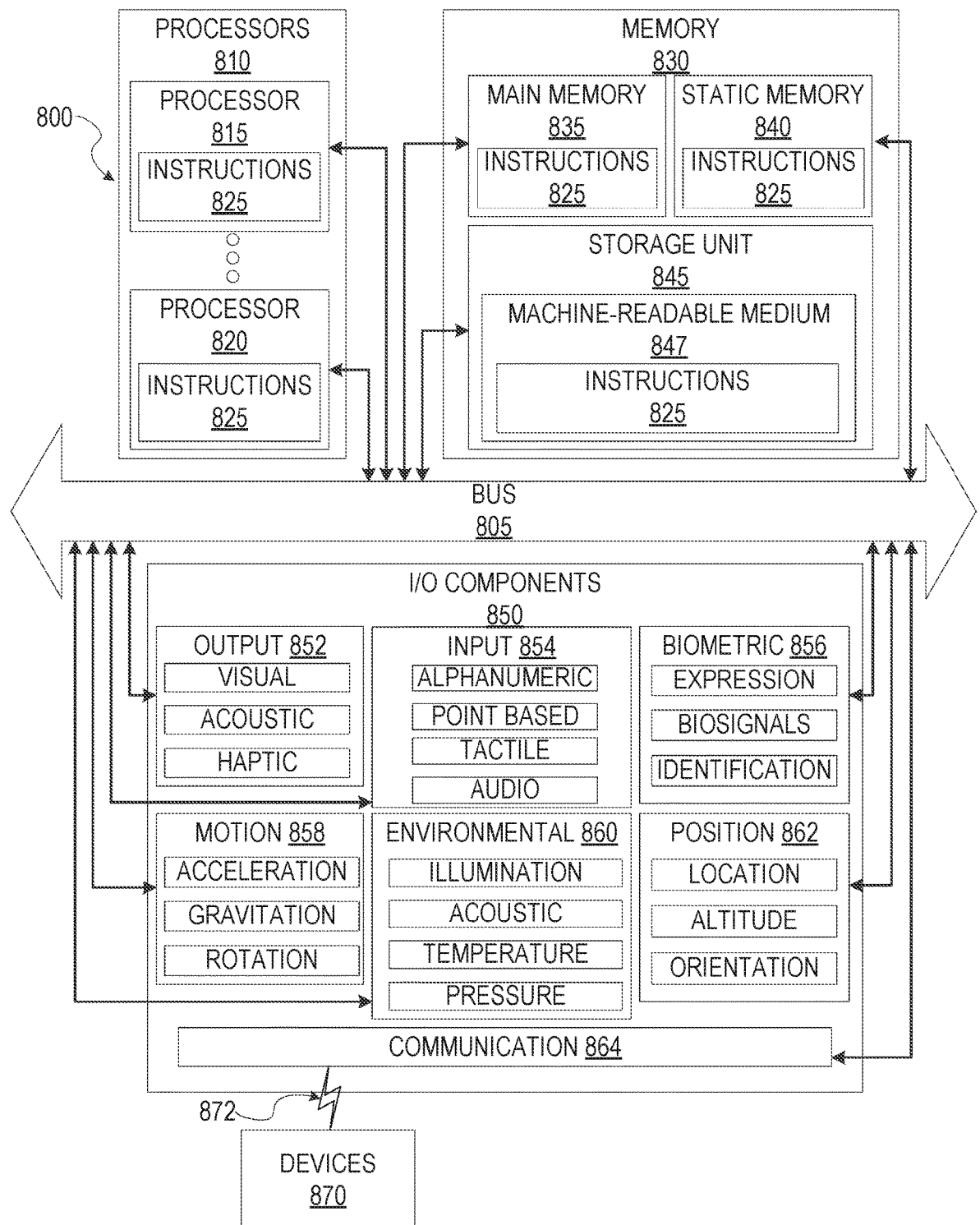
FIG. 8 is a block diagram illustrating components of a computer machine and associated components, in accordance with an example of the present disclosure.

FIG. 8 is a block diagram illustrating components of a machine 800, according to some examples, able to read instructions from a machine-readable medium (e.g., a machine-readable storage medium) and perform any one or more of the methodologies or functions discussed herein. Specifically, FIG. 8 shows a diagrammatic representation of the machine 800 in the example form of a computer system, within which instructions 825 (e.g., software, a program, an application, an applet, an app, or other executable code) for causing the machine 800 to perform any one or more of the processes, steps, determinations or methodologies discussed herein can be executed. In alternative examples, the machine 800 operates as a standalone device or can be coupled (e.g., networked) to other machines. In a networked deployment, the machine 800 can operate in the capacity of a server machine or a client machine in a server-client network environment, or as a peer machine in a peer-to-peer (or distributed) network environment. The machine 800 can comprise, but is not limited to, a server computer, a client computer, a PC, a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 825, sequentially or otherwise, that specify actions to be taken by the machine 800. Further, while only a single machine 800 is illustrated, the term "machine" shall also be taken to include a collection of machines 800 that individually or jointly execute the instructions 825 to perform any one or more of the methodologies discussed herein.

The machine 800 can include processors 810, memory 830, and I/O components 850, which can be configured to communicate with each other via a bus 805. In an example embodiment, the processors 810 (e.g., a CPU, a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) can include, for example, a processor 815 and a processor 820, which can execute the instructions 825. The term "processor" is intended to include multi-core processors 810 that can comprise two or more independent processors 815, 820 (also referred to as "cores") that can execute the instructions 825 contemporaneously. Although FIG. 8 shows multiple processors 810, the machine 800 can include a single processor 810 with a single core, a single processor 810 with multiple cores (e.g., a multi-core processor), multiple processors 810 with a single core, multiple processors 810 with multiple cores, or any combination thereof.

The memory 830 can include a main memory 835, a static memory 840, and a storage unit 845 accessible to the processors 810 via the bus 805. The storage unit 845 can include a machine-readable medium 847 on which are stored the instructions 825, embodying any one or more of the methodologies or functions described herein. The instructions 825 can also reside, completely or at least partially, within the main memory 835, within the static memory 840, within at least one of the processors 810 (e.g., within the processor's cache memory), or any suitable combination thereof, during execution thereof by the machine 800. Accordingly, the main memory 835, the static memory 840, and the processors 810 can be considered machine-readable media 847.

As used herein, the term "memory" refers to a machine-readable medium 847 able to store data temporarily or permanently and can be taken to include, but not be limited to, random-access memory (RAM), read-only memory (ROM), buffer memory, flash memory, and cache memory. While the machine-readable medium 847 is shown, in an example embodiment, to be a single medium, the term "machine-readable medium" should be taken to include a single medium or multiple media (e.g., a centralized or distributed database, or associated caches and servers) able to store the instructions 825. The term "machine-readable medium" shall also be taken to include any medium, or combination of multiple media, that is capable of storing instructions (e.g., instructions 825) for execution by a machine (e.g., machine 800), such that the instructions 825, when executed by one or more processors of the machine 800 (e.g., processors 810), cause the machine 800 to perform any one or more of the functions and methodologies described herein as pertaining to the trusted accident avoidance control systems. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 can include a wide variety of components to receive input, provide and/or produce output, transmit information, exchange information, capture measurements, and so on. It will be appreciated that the I/O components 850 can include many other components that are not shown in FIG. 8. In various examples, the I/O components 850 can include output components 852 and/or input components 854. The output components 852 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, and/or other pointing instruments), tactile input components (e.g., a physical button, a touch screen that provides location and force of touches or touch gestures, and/or other tactile input components), audio input components (e.g., a microphone), and the like.

In further examples, the I/O components 850 can include biometric components 856, motion components 858, environmental components 860, and/or position components 862, among a wide array of other components. For example, the biometric components 856 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 858 can include acceleration sensor components (e.g., accelerometer), gravitation sensor components, rotation sensor components (e.g., gyroscope), and so forth. The environmental components 860 can include, for example, illumination sensor components (e.g., photometer), acoustic sensor components (e.g., one or more microphones that detect background noise), temperature sensor components (e.g., one or more thermometers that detect ambient temperature), humidity sensor components, pressure sensor components (e.g., barometer), proximity sensor components (e.g., infrared sensors that detect nearby objects), and/or other components that can provide indications, measurements, and/or signals corresponding to a surrounding physical environment. The position components 862 can include location sensor components (e.g., inertial based sensor components, a Global Position System (GPS) receiver component), altitude sensor components (e.g., altimeters and/or barometers that detect air pressure from which altitude can be derived), orientation sensor components (e.g., magnetometers), and the like.

Communication can be implemented using a wide variety of technologies. The I/O components 850 can include communication components 864 operable to couple the machine 800 to a network 880 and/or devices 870 via a coupling 882 and a coupling 872, respectively. For example, the communication components 864 can include a network interface component or another suitable device to interface with the network 880. In further examples, the communication components 864 can include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 can be another machine 800 and/or any of a wide variety of peripheral devices (e.g., a peripheral device coupled via a USB).

Moreover, the communication components 864 can detect identifiers and/or include components operable to detect identifiers. For example, the communication components 864 can include radio frequency identification (RFID) tag reader components, NFC smart tag detection components, optical reader components (e.g., an optical sensor to detect one-dimensional bar codes such as Universal Product Code (UPC) bar codes, multi-dimensional bar codes such as a Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In addition, a variety of information can be derived via the communication components 864, such as location via Internet Protocol (IP) geolocation, location via Wi-Fi® signal triangulation, location via detecting an NFC beacon signal that can indicate a particular location, and so forth.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A trusted accident avoidance control system for a vehicle, comprising:
   a plurality of sensors operable to detect and measure one or more characteristics of at least one of a vehicle or a pre-defined path on which the vehicle is traveling;
   a first location determination component supported on the vehicle, and operable with one or more of the plurality of sensors to generate an estimated current position of the vehicle on the pre-defined path based on first sensor data;
   a second location determination component supported on the vehicle, and operable with one or more of the plurality of sensors to generate an estimated current position of the vehicle on the pre-defined path based on second sensor data;
   an error correction component operable to generate an updated estimated current position of the vehicle on the pre-defined path based on the first and second estimated current positions,
   wherein at least one of the first or second location determination components comprises a path correlation system comprising a path correlation component and a correlation database, wherein the path correlation system is operable to facilitate generation of the updated estimated current position from location information based on a correlation of heading change data corresponding to detected heading changes along the pre-defined path with stored heading change data and associated position data from the correlation database.

2. The trusted accident avoidance control system of claim 1, wherein the error correction component is operable with a path database to identify a predetermined threshold velocity for the updated estimated current position of the vehicle.

3. The trusted accident avoidance control system of claim 2, further comprising a velocity management component operable to determine, based on the updated estimated current position, whether a current velocity of the vehicle exceeds the predetermined threshold velocity corresponding to the updated estimated current position, and to initiate an accident avoidance measure in accordance with a determination that the current velocity of the vehicle exceeds the predetermined threshold velocity.

4. The trusted accident avoidance control system of claim 1, wherein at least one of the first or second location determination components comprises an inertial measurement unit (IMU), wherein the estimated current position of the vehicle is based on an initial position of the vehicle, and movement data measured by the IMU.

5. The trusted accident avoidance control system of claim 1, wherein at least one sensor of the plurality of sensors is operable to detect and identify a tag embedded in the pre-defined path, the tag being associated with predetermined tag identification data and tag location data, and wherein at least one of the first or second location determination components is operable to generate an estimated current position of the vehicle based on the detection and identification of one or more tags by the at least one sensor.

6. The trusted accident avoidance control system of claim 5, further comprising a tag database comprising predetermined tag identification data and associated tag location data for a plurality of tags associated with the plurality of pre-defined paths, wherein the at least one of the first or second location determination components is in communication with and operable to access the tag database and match the tag identification data of each of the one or more detected and identified tags to corresponding tag identification data from the tag database, and, upon at least a partial match, to retrieve the location data associated with the one or more detected tags, the location determination component further being operable to communicate the retrieved location data to the error correction component as supplemental position data to facilitate generation of the updated estimated current position.

7. The trusted accident avoidance control system of claim 1, wherein at least one sensor of the plurality of sensors is operable to detect one or more insulated joints in the pre-defined path, the insulated joints being associated with predetermined insulated joint data and insulated joint location data, and wherein at least one of the first or second location determination components comprises a track analysis component operable to determine a pattern of detected insulated joints over time based on the detection and identification of the one or more insulated joints by the at least one sensor.

8. The trusted accident avoidance control system of claim 7, further comprising a path feature database comprising the predetermined insulated joint data and associated insulated joint location data for a plurality of insulated joints associated with the plurality of pre-defined paths, wherein the at least one of the first or second location determination components is in communication with and operable to access the path feature database and match the pattern of detected insulated joints to corresponding predetermined insulated joint data from the path feature database, and, upon at least a partial match, to retrieve the stored, predetermined insulated joint location data associated with the stored, predetermined insulated joint data, and to provide the predetermined insulated joint location data to the error correction component as supplemental position data to facilitate generation of the updated estimated current position.

9. The trusted accident avoidance control system of claim 1, wherein the heading change data corresponding to the detected heading changes along the pre-defined path comprises at least one of a pattern of detected heading changes based on detected changes in a heading of the vehicle over time, an interrelationship between two or more turns, or a pattern of detected movement-based parameters based on movements of the vehicle over time.

10. The trusted accident avoidance control system of claim 9, wherein the pattern of detected movement-based parameters comprises a pattern of velocity independent parameters represented by the value 1/R derived by the path correlation component, where R is representative of the radius of a curve at a point of measurement.

11. The trusted accident avoidance control system of claim 1, wherein at least one sensor of the plurality of sensors comprises a camera operable to capture image data corresponding to various landmarks visible from the vehicle, and wherein at least one of the first or second location determination components comprises a landmark determination component operable to identify one or more landmarks in the image data over time.

12. The trusted accident avoidance control system of claim 11, further comprising a landmark database comprising predetermined landmark data associated with known landmarks, and associated landmark location data for a plurality of landmarks associated with the plurality of pre-defined paths, wherein the at least one of the first or second location determination components is in communication with and operable to access the and match the image data to the predetermined landmark data from the landmark database, and, upon at least a partial match, to retrieve the stored, predetermined landmark location data associated with the stored, predetermined landmark data, and to provide the predetermined landmark location data to the error correction component as supplemental position data to facilitate generation of the updated estimated current position.

13. The trusted accident avoidance control system of claim 1, wherein at least one of the first or second location determination components comprises tachometer operable with a wheel of the vehicle, and operable to generate position information by counting a number of counts corresponding to at least partial revolutions of the wheel of the vehicle.

14. The trusted accident avoidance control system of claim 1, further comprising a jerk detection sensor operable to detect jerk-based differential inertial accelerations, and wherein the system is further operable to determine whether the detected jerk based differential inertial acceleration exceeds a predetermined differential inertial acceleration threshold, wherein the accident avoidance measure initiated is based on a determination that the jerk based differential inertial acceleration exceeds the predetermined differential inertial acceleration threshold.

15. The trusted accident avoidance control system of claim 1, further comprising a zero-velocity vehicle condition as detected by at least one of a tachometer or an inertial measurement unit (IMU).

16. The trusted accident avoidance control system of claim 1, further comprising a threshold velocity database comprising predetermined path section data associated with a plurality of respective path sections of the pre-defined path, each respective path section representing a portion of the pre-defined path, the path section data comprising path section identifier data and threshold velocity associated with the path section identifier data for operation of the vehicle across the respective path sections of the pre-defined path.

17. The trusted accident avoidance control system of claim 16, wherein the error correction component correlates a current position of the vehicle and a corresponding current path section of the pre-defined path on which the vehicle is traveling, based on the updated estimated current positon of the vehicle on the pre-defined path, with the predetermined path section data to identify the threshold velocity for the current path section.

18. The trusted accident avoidance control system of claim 17, wherein a velocity management component is further operable to receive the predetermined threshold velocity for the current track section of the fixed track.

19. The trusted accident avoidance control system of claim 18, further comprising data corresponding to the current velocity of the vehicle received by the velocity management component, wherein the velocity management component correlates the predetermined threshold velocity for the current section of the pre-defined path, associated with the updated estimated current position, with the current velocity of the vehicle to determine whether the current velocity of the vehicle exceeds the predetermined threshold velocity.

20. The trusted accident avoidance control system of claim 3, wherein the velocity management component is in communication with one or more vehicle operator notification systems, and wherein the accident avoidance measure comprises a notification to an operator that the current velocity exceeds the predetermined threshold velocity, wherein the notification comprises at least one of a visual notification, an auditory notification, or a haptic notification.

21. The trusted accident avoidance control system of claim 3, wherein the velocity management component is in communication with a vehicle control system, and is operable to send an automatic velocity reduction command to the vehicle control system, wherein the accident avoidance measure comprises an automatic reduction in the current velocity of the vehicle to below the predetermined threshold velocity.

22. The trusted accident avoidance control system of claim 16, wherein the threshold velocity database comprises path section data for respective paths of the plurality of pre-defined paths at various geographical locations.

23. The trusted accident avoidance control system of claim 1, further comprising at least one additional location determination component, the first, second and at least one additional location determination components each being operable to estimate a current location of the vehicle and to generate corresponding position data to be communicated to the error correction component, wherein the updated estimated current position is based on the estimated current positions from the first, second and at least one additional location determination components.

24. A computer-implemented method for trusted positive vehicle control for reducing the potential for accidents of a vehicle operating about a path, the method comprising:
estimating, using a first location determination component, a first estimated current position of a vehicle on a pre-defined path based on first sensor data;
estimating, using a second location determination component, a second estimated current position of the vehicle on the pre-defined path based on second sensor data, wherein at least one of the first or second location determination components comprises a path correlation system comprising a path correlation component and a correlation database;
correlating, using the path correlation system, heading change data corresponding to detected heading changes along the pre-defined path with stored heading change data and associated position data from the correlation database, wherein the first or second estimated current position of the vehicle comprises the associated position data; and
calculating, using an error correction component, an updated estimated current position of the vehicle based on the first and second estimated current positions.

25. The method of claim 24, further comprising:
determining, based on the updated estimated current position, whether a current velocity of the vehicle exceeds a predetermined threshold velocity corresponding to the updated estimated current position; and
initiating an accident avoidance measure in accordance with a determination that the current velocity of the vehicle exceeds the predetermined threshold velocity.

26. The trusted accident avoidance control system of claim 1, wherein the correlation database comprises the stored heading change data and the associated position data for a plurality of pre-defined paths.

27. The trusted accident avoidance control system of claim 1, wherein at least one sensor of the plurality of sensors is operable to detect the heading changes along the pre-defined path.

28. The trusted accident avoidance control system of claim 1, wherein the heading change data corresponding to the detected heading changes along the pre-defined path comprises a pattern of detected heading changes based on detected changes in a heading of the vehicle over time, and wherein the associated position data from the correlation database is based on a last heading change of the detected changes in a heading of the vehicle over time.

29. The method of claim 24, further comprising storing, using the correlation database, the stored heading change data and associated position database for a plurality of pre-defined paths.

30. The method of claim 24, further comprising detecting, using at least one of the first sensor data and the second sensor data, the heading changes along the pre-defined path.

31. The method of claim 24, wherein the heading change data corresponding to the detected heading changes along the pre-defined path comprises a pattern of detected heading changes based on detected changes in a heading of the vehicle over time, and wherein the associated position data from the correlation database is based on a last heading change of the detected changes in a heading of the vehicle over time.

* * * * *